United States Patent
Takamatsu et al.

(10) Patent No.: US 9,625,800 B2
(45) Date of Patent: Apr. 18, 2017

(54) LIGHT SOURCE, LIGHT SOURCE APPARATUS, AND IMAGE DISPLAY APPARATUS TO FACILITATE COOLING AND HANDLING OF THE LIGHT SOURCE

(71) Applicant: SONY CORPORATION, Tokyo (JP)

(72) Inventors: Takashi Takamatsu, Tokyo (JP); Yoshihisa Aikoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 14/429,485

(22) PCT Filed: Oct. 2, 2013

(86) PCT No.: PCT/JP2013/005868
§ 371 (c)(1),
(2) Date: Mar. 19, 2015

(87) PCT Pub. No.: WO2014/073152
PCT Pub. Date: May 15, 2014

(65) Prior Publication Data
US 2015/0234265 A1    Aug. 20, 2015

(30) Foreign Application Priority Data
Nov. 6, 2012   (JP) ................................. 2012-244314

(51) Int. Cl.
G03B 21/14    (2006.01)
G03B 21/20    (2006.01)
(Continued)

(52) U.S. Cl.
CPC ............ *G03B 21/2013* (2013.01); *F21K 9/56* (2013.01); *G03B 21/142* (2013.01); *G03B 21/16* (2013.01);
(Continued)

(58) Field of Classification Search
CPC .. G03B 21/142; G03B 21/16; G03B 21/2013; G03B 21/204; H04N 9/315
See application file for complete search history.

(56) References Cited

U.S. PATENT DOCUMENTS

2002/0114158 A1    8/2002  Chuang
2003/0147255 A1    8/2003  Im
(Continued)

FOREIGN PATENT DOCUMENTS

CN    103454844 A    12/2013
JP    2001-356404 A    12/2001
(Continued)

OTHER PUBLICATIONS

International Search Report issued Dec. 17, 2013 in PCT/JP2013/005868.
(Continued)

*Primary Examiner* — Sultan Chowdhury
*Assistant Examiner* — Magda Cruz
(74) *Attorney, Agent, or Firm* — Oblon, McClelland, Maier & Neustadt, L.L.P.

(57) ABSTRACT

A light source unit includes one or more solid-state light sources and a light collecting optical system. The one or more solid-state light sources are arranged on a rear side of an output portion and each output light in a predetermined wavelength range along the same direction as an optical-axis direction. The output portion includes a light emitter that is excited by the light in the predetermined wavelength range with a predetermined direction as the optical-axis direction to emit visible light in a wavelength range longer than the predetermined wavelength range. The output portion is also capable of outputting light containing the light in the predetermined wavelength range and the visible light from the light emitter along the optical-axis direction. The light
(Continued)

collecting optical system collects the light in the predetermined wavelength range.

13 Claims, 29 Drawing Sheets

(51) Int. Cl.
    *F21K 99/00*     (2016.01)
    *H04N 9/31*     (2006.01)
    *G03B 21/16*     (2006.01)
    *F21Y 101/02*     (2006.01)

(52) U.S. Cl.
    CPC ....... *G03B 21/204* (2013.01); *G03B 21/2066* (2013.01); *H04N 9/315* (2013.01); *F21Y 2101/02* (2013.01); *F21Y 2101/025* (2013.01)

(56) References Cited

U.S. PATENT DOCUMENTS

| | | | |
|---|---|---|---|
| 2010/0328617 A1 | 12/2010 | Masuda | |
| 2010/0328633 A1* | 12/2010 | Sato | G02B 27/1033 353/99 |
| 2012/0075599 A1* | 3/2012 | Park | G03B 21/14 353/121 |
| 2012/0236264 A1 | 9/2012 | Akiyama | |
| 2013/0321777 A1* | 12/2013 | Wang | F21V 13/08 353/31 |
| 2014/0078475 A1 | 3/2014 | Masuda | |

FOREIGN PATENT DOCUMENTS

| | | |
|---|---|---|
| JP | 2002-270005 A | 9/2002 |
| JP | 2003-248270 A | 9/2003 |
| JP | 2004-279441 A | 10/2004 |
| JP | 2012-48847 A | 3/2012 |
| JP | 2012-88657 A | 5/2012 |
| JP | 2012-103615 A | 5/2012 |
| JP | 2012-118220 A | 6/2012 |

OTHER PUBLICATIONS

Combined Chinese Office Action and Search Report issued Apr. 5, 2016 in Patent Application No. 201380056294.3. (with English language translation).

Extended European Search Report issued Jun. 3, 2016 in Patent Application No. 13852837.7.

Office Action issued Dec. 1, 2016 in Chinese Patent Application No. 201380056294.3 (with English-language Translation).

* cited by examiner (A)
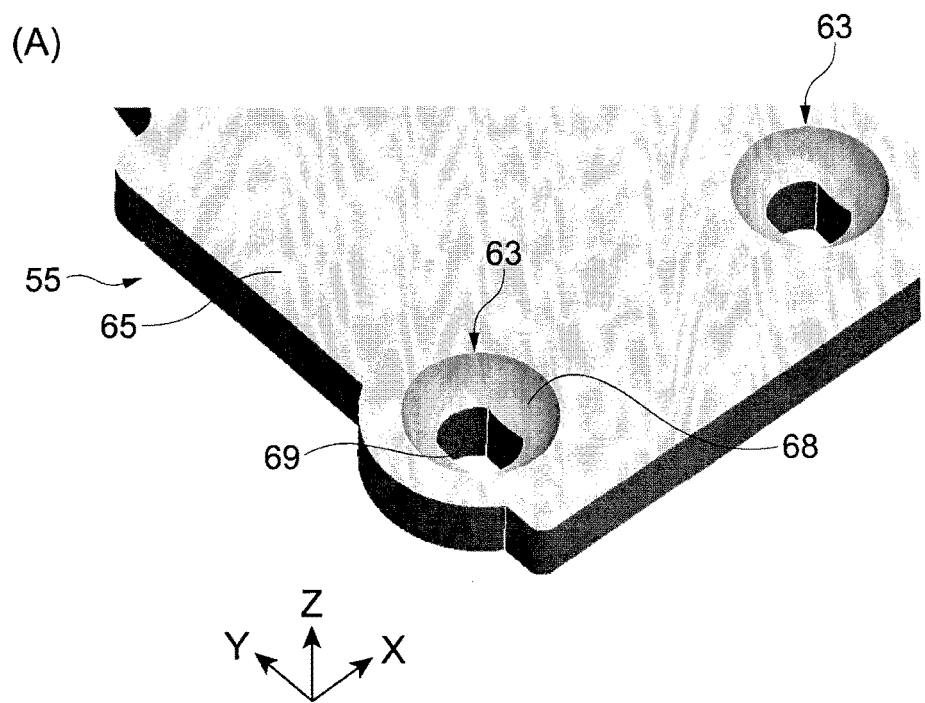
(B)
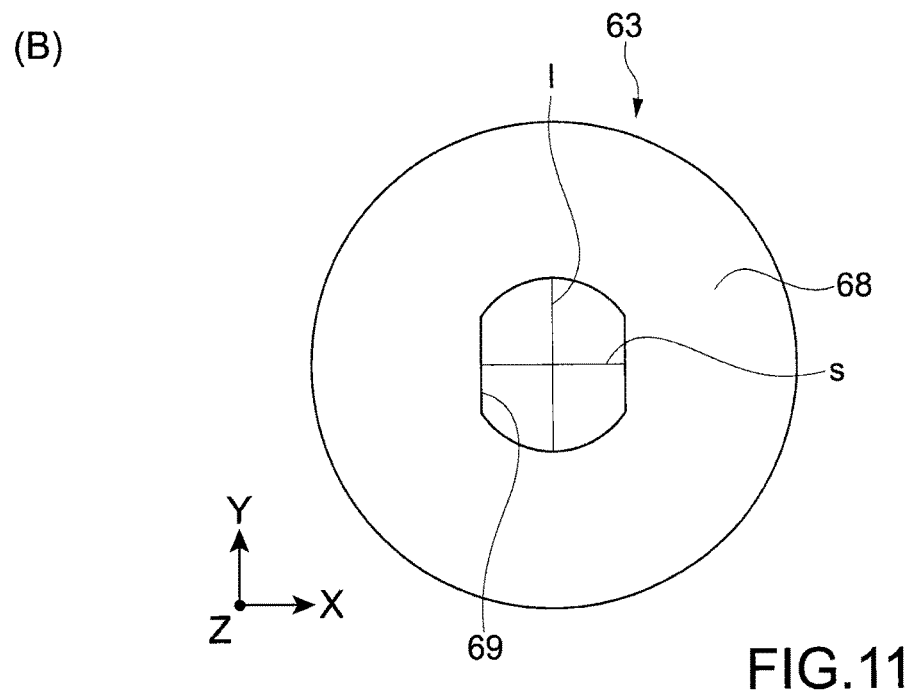
FIG.11

| NA of object side | 0.8067 |
|---|---|
| Focal length (f1) of first optical system | 5.355 |
| Focal length (f2) of second optical system | 55.620 |

| | | Curvature radius | Interval | n(445nm) | Remarks |
|---|---|---|---|---|---|
| | First light-source surface | infinity | 0.300 | | Initial surface of array |
| First optical system | S1 | infinity | 0.250 | 1.53308 | |
| | S2 | infinity | 1.780 | | |
| | S3 | infinity | 4.500 | 1.49959 | End surface of array |
| | S4 (Aspheric surface) | -15.700 | 50.000 | | Aspheric reflecting surface |
| Second optical system | S5 (Aspheric surface) | -111.240 | -32.290 | | Planar reflecting surface |
| | S6 (Eccentric surface) | infinity | 17.500 | | |
| | S7 (Eccentric surface) | infinity | 0.700 | 1.53308 | |
| | Second light-source surface | infinity | 0.000 | | |

| | K | A2 | A3 | A4 | A5 | A6 | A8 | A10 |
|---|---|---|---|---|---|---|---|---|
| | 10.50000 | -1.590E-01 | 5.876E-05 | -3.294E-03 | 2.013E-04 | -1.879E-04 | 2.255E-06 | -5.572E-07 |

S5

| K | -1.00000 |
|---|---|

S6

| Rotation about y axis | 20 degrees |
|---|---|

S7

| Shift along x axis | 14.97mm |
|---|---|

FIG.19

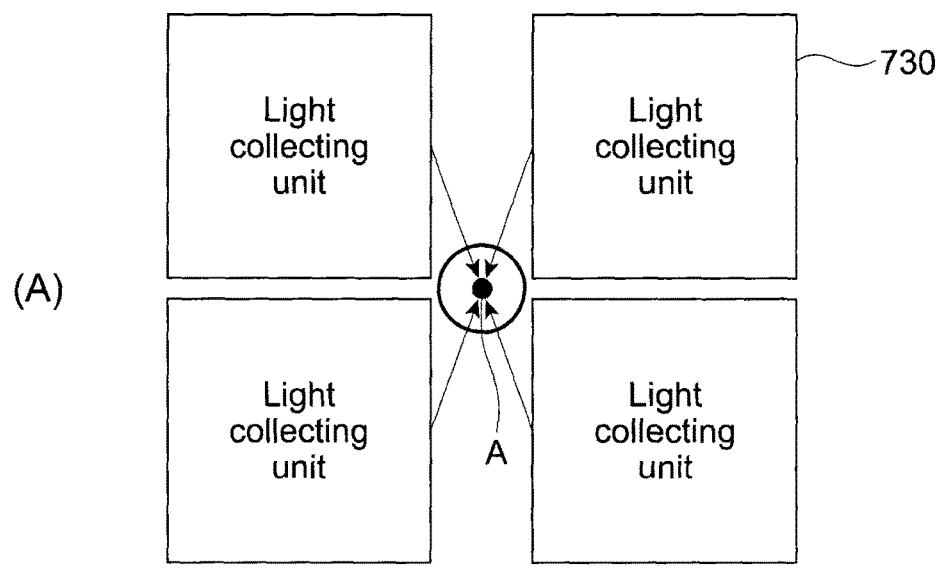
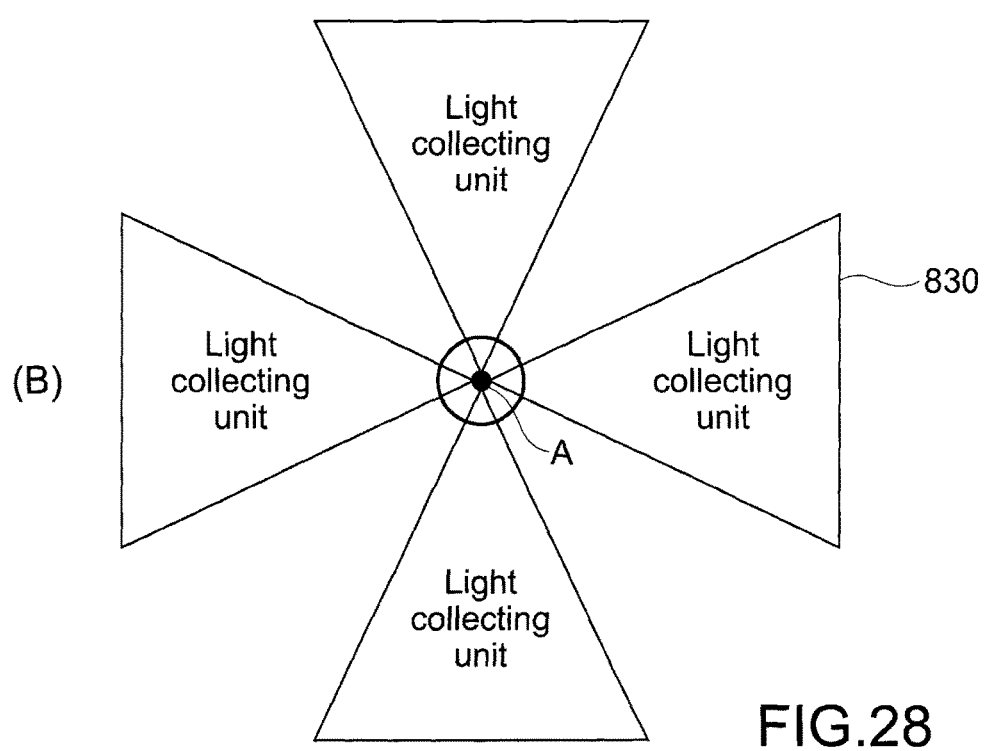
FIG. 28

LIGHT SOURCE, LIGHT SOURCE APPARATUS, AND IMAGE DISPLAY APPARATUS TO FACILITATE COOLING AND HANDLING OF THE LIGHT SOURCE

TECHNICAL FIELD

The present technology relates to a light source unit, a light source apparatus, and an image display apparatus using the light source unit and the light source apparatus.

BACKGROUND ART

Recently, products that adopts solid-state light sources, such as an LED (light-emitting diode) and an LD (laser diode), as light sources used in projectors for presentation or for digital cinema have been increasingly used instead of mercury lamps, xenon lamps, and the like used in related art. The fixed light sources such as LEDs have advantages such as having long lifetime, no replacement of lamps, which is necessary in related art, and lighting-up immediately after power-on.

Such a projector includes a type in which a solid-state light source is directly used as a light source. On the other hand, there is another type in which a light emitter such as a phosphor, which is excited by excitation light to emit light, is used as a light source. In this case, the solid-state light source is used as an excitation light source that outputs excitation light.

For example, in a light source device described in Patent Document 1, blue light output from first and second solid-state light source groups is collected by a light collecting optical system and applied to a phosphor generation unit. In the phosphor generation unit, with the blue light as excitation light, a phosphor containing red light and green light is generated. Thus, white light containing the blue light, the red light, and the green light is output from the phosphor generation unit (see FIGS. 1 and 2 etc. of Patent Document 1).

Patent Document 1: Japanese Patent Application Laid-open No. 2012-118302

SUMMARY OF INVENTION

Problem to be Solved by the Invention

In the optical system described in Patent Document 1, the first and second solid-state light source groups are arranged so as to have different optical axes. The light traveling directions of the blue light output from the respective solid-state light source groups are aligned by first and second reflection units to be input to the light collecting optical system. Along the input direction thereof, the blue light is applied from the light collecting optical system to the phosphor generation unit, and white light is output from the phosphor generation unit. As described above, the optical system described in Patent Document 1 has a complex structure. So, it is difficult to perform cooling of the solid-state light source unit or handling of the blue light.

In view of the circumstances as described above, it is an object of the present technology to provide a light source unit, a light source apparatus, and an image display apparatus that facilitate the cooling of a light source and the handling of light.

Means for Solving the Problem

In order to achieve the object described above, according to an embodiment of the present technology, there is provided a light source unit including one or more solid-state light sources and a light collecting optical system.

The one or more solid-state light sources are arranged on a rear side of an output portion and each output light in a predetermined wavelength range along the same direction as an optical-axis direction, the output portion including a light emitter that is excited by the light in the predetermined wavelength range with a predetermined direction as the optical-axis direction to emit visible light in a wavelength range longer than the predetermined wavelength range and is capable of outputting light containing the light in the predetermined wavelength range and the visible light from the light emitter along the optical-axis direction.

The light collecting optical system collects the light in the predetermined wavelength range, the light being output from the one or more solid-state light sources, onto the light emitter from the rear side of the output portion.

In this light source unit, one or more solid-state light sources are arranged on a rear side of an output portion capable of outputting light containing light in a predetermined wavelength range and visible light from a light emitter. The light in the predetermined wavelength range is output from the one or more solid-state light sources along the same direction as an optical-axis direction of the output portion. The light is collected onto the light emitter of the output portion by the light collecting optical system. This allows a space for cooling the one or more solid-state light sources to be easily ensured. Further, since the optical-axis direction of the output portion and the optical-axis direction of the one or more solid-state light sources are the same direction, this facilitates the handling of light in a predetermined wavelength range.

The light collecting optical system may include an aspheric reflecting surface that reflects and collects the light from the one or more solid-state light sources.

Using the aspheric reflecting surface to collect light to the light emitter allows the light source apparatus to be made compact. For example, even in the case where the number of solid-state light sources is increased so as to achieve a high luminance, the size of the light collecting optical system can be prevented from being increased. As a result, it is possible to achieve a high luminance while suppressing the growing in size of the apparatus. Further, using the aspheric reflecting surface allows easy achievement of a structure in accordance with a necessary luminance and shape.

The light collecting optical system may include a reflecting member that reflects the light from the one or more solid-state light sources to the light emitter, the light being reflected on the aspheric reflecting surface.

With such a reflecting member, the degree of freedom on the design of the light collecting optical system can be increased. As a result, the downsizing and a desired shape of the light source apparatus can be achieved.

The reflecting member may include any one of a planar reflecting surface, a concave reflecting surface, and a convex reflecting surface as a reflecting surface that reflects the light from the one or more solid-state light sources.

Appropriately selecting a reflecting surface having a desired shape allows the downsizing, a desired shape, and the like of the light source apparatus to be achieved.

The light collecting optical system may include a light collecting lens that collects the light from the one or more solid-state light sources.

In such a manner, the light from the one or more solid-state light sources may be collected by the light collecting lens.

The light collecting optical system may include a light guide optical system including one or more planar reflecting surfaces and guiding the light from the one or more solid-state light sources to the light collecting lens.

With such a light guide optical system, the optical-axis direction of the output portion and the optical-axis direction of the one or more solid-state light sources may be set to be the same direction.

The light source unit may further include an arrangement surface that is a surface perpendicular to the optical-axis direction, the one or more solid-state light sources being arranged on the arrangement surface.

This allows a space on the rear side of the arrangement surface to be easily ensured as a space for cooling the one or more solid-state light sources. With a cooling member and the like being arranged in this space, the one or more solid-state light sources can be cooled from the rear side.

The arrangement surface may have a multiangular shape in plan view from the optical-axis direction.

This allows the light source unit to be established according to a necessary luminance or shape.

The arrangement surface may have a triangular shape in plan view from the optical-axis direction.

This allows the light source unit to be established according to a necessary luminance or shape.

The light source unit may further include a support portion that supports the one or more solid-state light sources and the light collecting optical system as one unit.

As being supported as one unit by the support portion, a plurality of light source units can be arranged easily. Further, it is also possible to appropriately combine and arrange light source units having various configurations.

According to another embodiment of the present technology, there is provided a light source apparatus including an output portion and one or more light source units.

The output portion includes a light emitter that is excited by light in a predetermined wavelength range with a predetermined direction as an optical-axis direction to emit visible light in a wavelength range longer than the predetermined wavelength range, and is capable of outputting light containing the light in the predetermined wavelength range and the visible light from the light emitter along the optical-axis direction.

The one or more light source units include one or more solid-state light sources and a light collecting optical system.

The one or more solid-state light sources are arranged on a rear side of the output portion and each output the light in the predetermined wavelength range along the same direction as the optical-axis direction.

The light collecting optical system collects the light in the predetermined wavelength range, the light being output from the one or more solid-state light sources, onto the light emitter from the rear side of the output portion.

The one or more light source units may be a plurality of light source units that are arranged symmetrically about an optical axis of the light output from the output portion.

This allows a high luminance to be achieved.

According to another embodiment of the present technology, there is provided an image display apparatus including a light source apparatus, an image generation system, and a projection system.

The light source apparatus includes an output portion and one or more light source units.

The output portion includes a light emitter that is excited by light in a predetermined wavelength range with a predetermined direction as an optical-axis direction to emit visible light in a wavelength range longer than the predetermined wavelength range, and is capable of outputting light containing the light in the predetermined wavelength range and the visible light from the light emitter along the optical-axis direction.

The one or more light source units include one or more solid-state light sources and a light collecting optical system.

The one or more solid-state light sources are arranged on a rear side of the output portion and each output the light in the predetermined wavelength range along the same direction as the optical-axis direction.

The light collecting optical system collects the light in the predetermined wavelength range, the light being output from the one or more solid-state light sources, onto the light emitter from the rear side of the output portion.

The image generation system includes an image generation element and an illumination optical system.

The image generation element generates an image based on applied light.

The illumination optical system applies output light from the light source apparatus to the image generation element.

The projection system projects the image generated by the image generation element.

Effect of the Invention

As described above, according to the present technology, it is possible to facilitate the cooling of a light source and the handling of light.

BRIEF DESCRIPTION OF DRAWINGS

FIG. 11 is a view showing a shaft support hole formed in a lower support portion of a support frame.

FIG. 18 is a table showing data items on the light collecting unit in the example.

FIG. 19 is a table showing data items on the light collecting unit in the example.

FIG. 28 is a schematic view showing another configuration example in which a plurality of light collecting units are arranged.

MODE(S) FOR CARRYING OUT THE INVENTION

Hereinafter, embodiments of the present technology will be described with reference to the drawings.

<First Embodiment>
<Light Source Apparatus>

Figure 1:
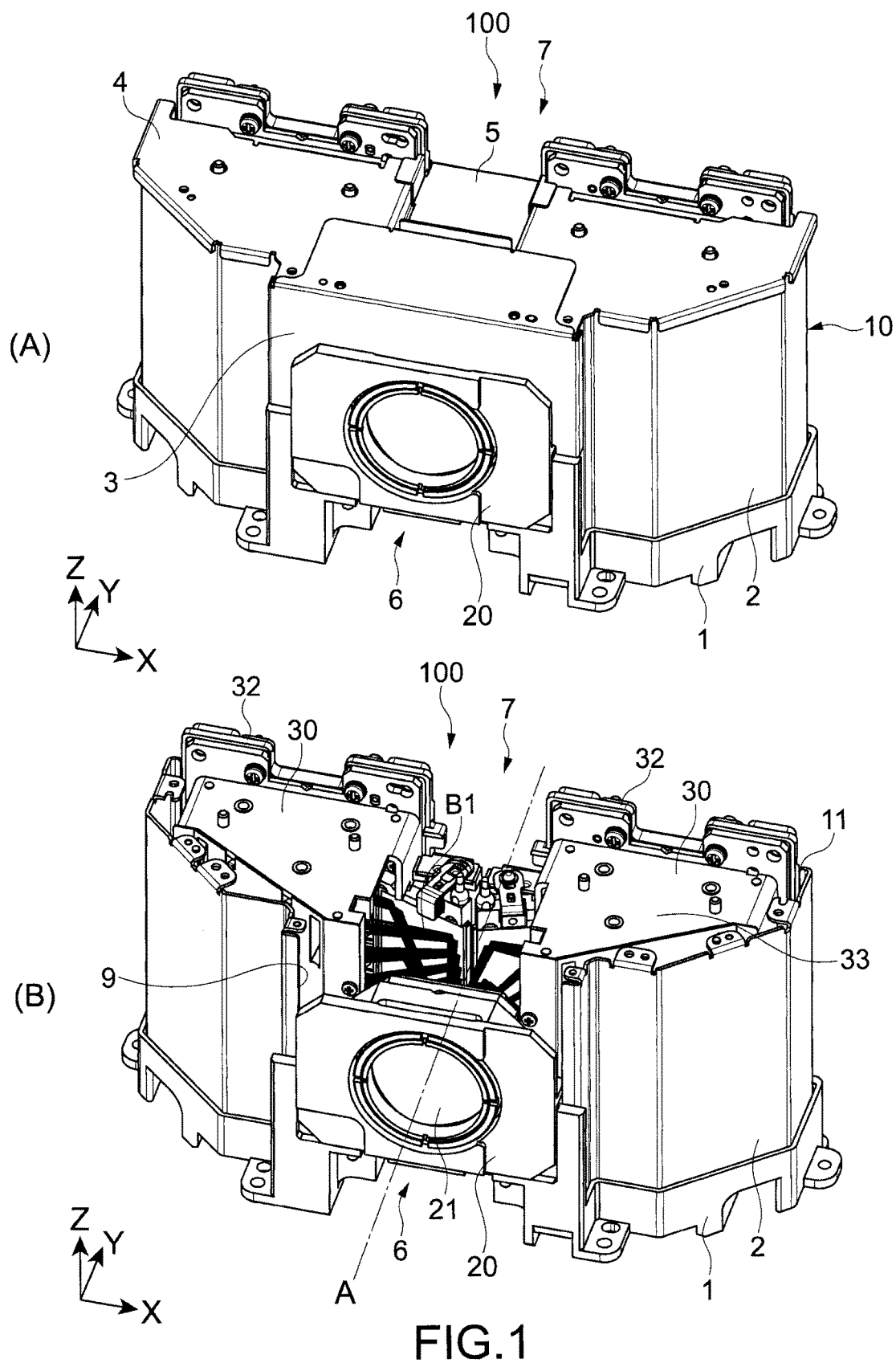
FIG. 1 is a perspective view showing a configuration example of a light source apparatus according to a first embodiment of the present technology.

FIG. 1 is a perspective view showing a configuration example of a light source apparatus 100 according to a first embodiment of the present technology. The light source apparatus 100 is a light source apparatus for a projector and has a type in which laser light in a blue wavelength range is combined with light in red and green wavelength ranges, to output white light. The light in red and green wavelength ranges is generated from a fluorescent substance excited by the laser light in the blue wavelength range.

As shown in FIG. 1(A), the light source apparatus 100 includes a base 1 provided to a bottom portion and a side wall portion 2 fixed to the base 1. Further, the light source apparatus 100 includes a front surface portion 3, a top surface portion 4, and a lid portion 5. The front surface portion 3 and the top surface portion 4 are connected to the side wall portion 2. The lid portion 5 is connected to the top surface portion 4. Those side wall portion 2, front surface portion 3, top surface portion 4, and lid portion 5 form a casing 10 of the light source apparatus 100.

The base 1 has an elongate shape extending in one direction. A longitudinal direction of the elongated base 1 is a horizontal direction of the light source apparatus 100, and a short-side direction perpendicular to the longitudinal direction is a front-back direction thereof. So, one of two longitudinal portions that are opposed to each other in the short-side direction is a front side 6, and the other one is a rear side 7. Further, a direction perpendicular to both the longitudinal direction and the short-side direction is a height direction of the light source apparatus 100. In the example shown in FIG. 1, an x-axis direction, a y-axis direction, and a z-axis direction correspond to the horizontal direction, the front-back direction, and the height direction, respectively.

FIG. 1(B) is a view omitting illustration of the front surface portion 3, the top surface portion 4, and the lid portion 5, and showing an example of the internal configuration of the light source apparatus 100. As shown in FIG. 1(B), in the side wall portion 2, a notch 9 is formed at the center of the front side 6, and an opening 11 is formed on the rear side 7. A phosphor unit 20 is arranged in the notch 9 on the front side 6 of the side wall portion 2. The phosphor unit 20 is fixed to the base 1 via the notch 9 such that an output surface 21 faces the front. So, an optical axis A of light output from the phosphor unit 20 extends along the y-axis direction passing through substantially the center of the base 1. Specifically, in this embodiment, the y-axis direction corresponds to a predetermined direction and such a direction is set as an optical-axis direction.

Two light collecting units 30 are arranged on the rear side 7 of the phosphor unit 20. The light collecting units 30 are arranged symmetrically about the optical axis A of the light output from the phosphor unit 20. As will be described later in detail, each of the light collecting units 30 includes a plurality of laser light sources 31 capable of outputting blue laser light B1. As shown in FIG. 1(B), two light source portions 32 each including the plurality of laser light sources 31 are arranged side by side in the longitudinal direction in the opening 11 on the rear side 7 of the side wall portion 2. The plurality of laser light sources 31 are arranged such that the blue laser light B1 is output along the same direction as the optical-axis direction of the optical axis A. The light collecting units 30 collect the blue laser light B1, which is output from the plurality of laser light sources 31, toward the phosphor unit 20.

As shown in FIG. 1(A), the top surface portion 4 is arranged on the upper side of the two light collecting units 30. The top surface portion 4 is connected to the side wall portion 2 and the two light collecting units 30. The front surface portion 3 is arranged on the upper side of the phosphor unit 20 and connected to the phosphor unit 20, the top surface portion 4, and the base 1. The lid portion 5 is arranged so as to cover the intermediate portion between the two light collecting units 30 and connected to the top surface portion 4.

A method of fixing and connecting the members is not limited. For example, the members are engaged with one another via predetermined engaging portions and fixed and connected to one another by screw clamp or the like.

Figure 2:
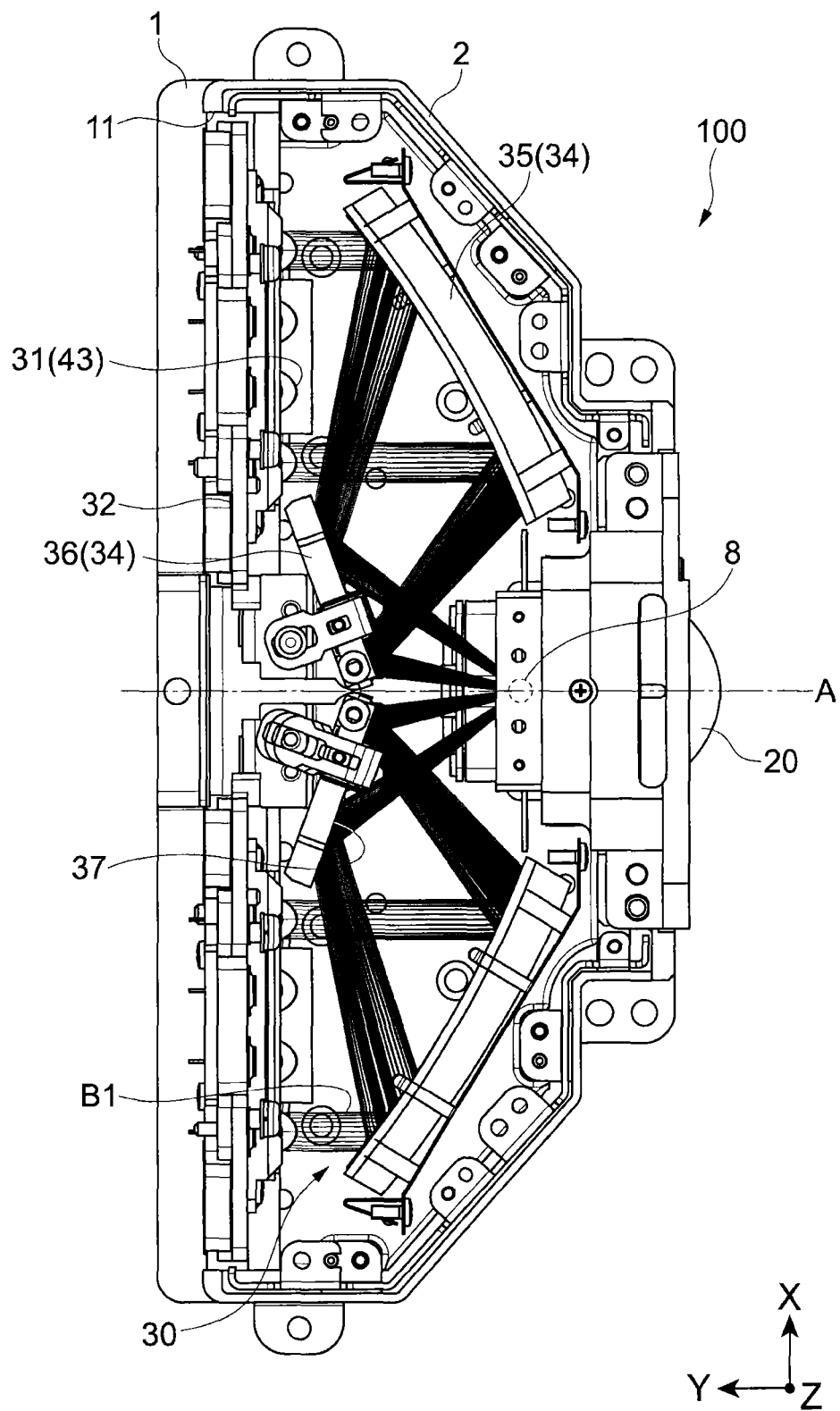
FIG. 2 is a plan view of the light source apparatus shown in FIG. 1(B), viewed from above.
Figure 3:
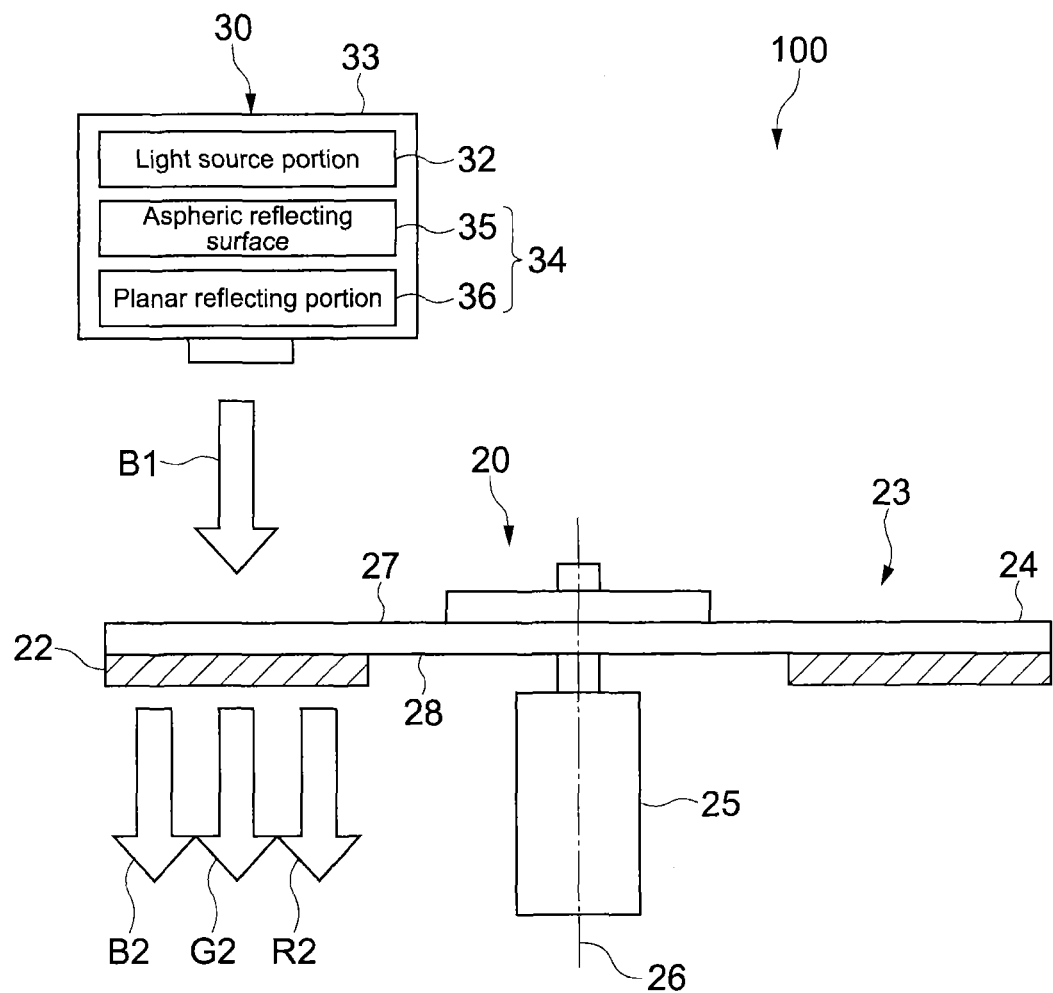
FIG. 3 is a schematic configuration view for describing light emission by the light source apparatus.

FIG. 2 is a plan view of the light source apparatus 100 shown in FIG. 1(B), viewed from above. In FIG. 2, the illustration of a support portion 33 is omitted. The support portion 33 supports the light collecting units 30 as one unit. FIG. 3 is a schematic configuration view for describing light emission by the light source apparatus 100.

The light collecting unit 30 includes the light source portion 32, a light collecting optical system, and the support portion 33. The light source portion 32 includes the plurality of laser light sources 31. The light collecting optical system collects the blue laser light B1, which is output light from the plurality of laser light sources 31, to a predetermined point 8. The support portion 33 supports the light source portion 32 (one or more solid-state light sources) and the light collecting optical system 34 as one unit.

For example, the plurality of laser light sources 31 are blue laser light sources capable of oscillating the blue laser light B1 having a peak wavelength of an emission intensity within a wavelength range of 400 nm to 500 nm. The plurality of laser light sources 31 correspond to one or more solid-state light sources that are arranged on the rear side of the phosphor unit 20 and output light in a predetermined wavelength range along the same direction as the optical-axis direction. Other light sources such as an LED (light-emitting diode) may be used as the solid-state light source. Further, the light in the predetermined wavelength range is also not limited to the blue laser light B1.

The light collecting optical system 34 collects the blue laser light B1, which is output from the plurality of laser light sources 31, onto a phosphor 22 from the rear side of the phosphor unit 20. The light collecting optical system 34 of this embodiment includes an aspheric reflecting surface 35 and a planar reflecting portion 36. The aspheric reflecting surface 35 reflects and collects the output light from the plurality of laser light sources 31.

The planar reflecting portion 36 reflects the light from the plurality of laser light sources 31, which is reflected on the aspheric reflecting surface 35, to the phosphor 22. The planar reflecting portion 36 includes a planar reflecting surface 37 as a reflecting surface that reflects the light from the plurality of laser light sources 31, and reflects the light to the phosphor 22 using the planar reflecting surface 37. This causes the blue laser light B1 from the plurality of laser light sources 31 to be collected onto the predetermined point 8 on the phosphor 22 of the phosphor unit 20.

The support portion 33 described above supports the light source portion 32, the aspheric reflecting surface 35, and the planar reflecting portion 36 as one unit. The light collecting unit 30 corresponds to a light source unit in this embodiment. The light collecting unit 30 will be described later in detail.

A phosphor wheel 23 shown in FIG. 3 is provided in the phosphor unit 20. The phosphor wheel 23 includes a disk-like substrate 24 and a phosphor layer 22. The substrate 24 transmits the blue laser light B1. The phosphor layer 22 is provided on an arrangement surface 28 of the substrate 24. A motor 25 that drives the phosphor wheel 23 is connected to the center of the substrate 24. The phosphor wheel 23 has a rotating axis 26 on a normal line passing through the center of the substrate 24 and is rotatable about the rotating axis 26.

The rotating axis 26 of the phosphor wheel 23 is provided such that its extending direction is the same direction as the optical axis A passing through substantially the center of the phosphor unit 20. Further, the rotating axis 26 is arranged at a position different from the optical axis A such that the predetermined point 8 of the phosphor layer 22 is located at substantially the center of the phosphor unit 20 (on the optical axis A). As shown in FIG. 2, the light collecting unit 30 collects the blue laser light B1 to the predetermined point 8 located at substantially the center of the phosphor unit 20.

As shown in FIG. 3, the phosphor wheel 23 is arranged such that a main surface 27, which is one of the two main surfaces of the substrate 24 and on which the phosphor layer 22 is not provided, faces the light collecting unit 30. Further, the phosphor wheel 23 is arranged such that a focal position of the blue laser light B1 collected by the light collecting unit 30 matches the predetermined point on the phosphor layer 22.

The phosphor layer 22 corresponds to a light emitter that is excited by light from the plurality of laser light sources 31 and emits visible light in a wavelength range longer than that of the light from the plurality of laser light sources 31. In this embodiment, the phosphor layer 22 contains a fluorescent substance that emits fluorescence by being excited by the blue laser light B1 having a center wavelength of approximately 445 nm. The phosphor layer 22 converts part of the blue laser light B1, which is output by the plurality of laser light sources 31, into light in a wavelength range including a range from the red to green wavelength ranges (that is, yellow light) and then outputs the resultant light.

As the fluorescent substance contained in the phosphor layer 22, for example, a YAG (yttrium, aluminum, garnet)-based phosphor is used. It should be noted that the type of a fluorescent substance, a wavelength range of excited light, and a wavelength range of the visible light generated by excitation are not limited.

Further, the phosphor layer 22 transmits part of the excitation light while absorbing part of the excitation light, and thus the phosphor layer 22 can also output the blue laser light B1 output from the plurality of laser light sources 31. Thus, the light output from the phosphor layer 22 is white light obtained by combination of the blue excitation light and the yellow fluorescence. In order to transmit the part of the excitation light as described above, the phosphor layer 22 may contain filler particles as particulate substance having light transparency, for example.

By the rotation of the substrate 24 by the motor 25, the laser light sources 31 apply the excitation light to the phosphor layer 22 while an application position is relatively moved on the phosphor layer 22. Thus, light containing blue laser light B2, which has passed through the phosphor layer 22, and green light G2 and red light R2 serving as visible light output from the phosphor layer 22 is output as output light by the phosphor unit 20. By the rotation of the phosphor wheel 23, deterioration due to the excitation light applied to the same position of the phosphor layer 22 for a long period of time can be avoided.

The phosphor unit 20 corresponds to an output portion in this embodiment. It should be noted that the configuration of the phosphor unit 20 is not limited, and for example, the phosphor wheel 23 may not be used. For example, the phosphor layer 22 may be held by another holding portion, and blue laser light from the light collecting unit 30 may be collected thereto.

Figure 4:
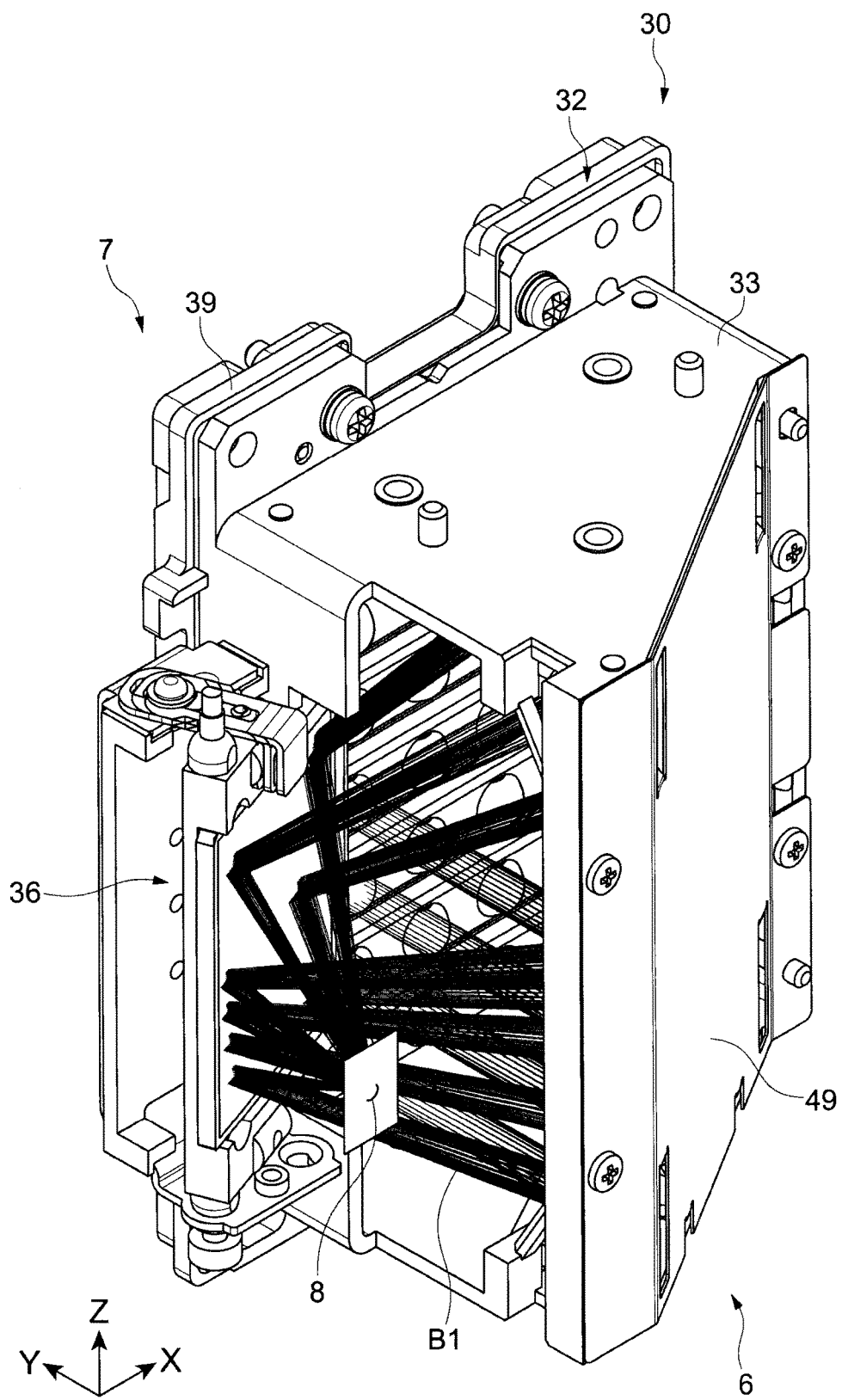
FIG. 4 is a perspective view showing a configuration example of a light collecting unit.
Figure 5:
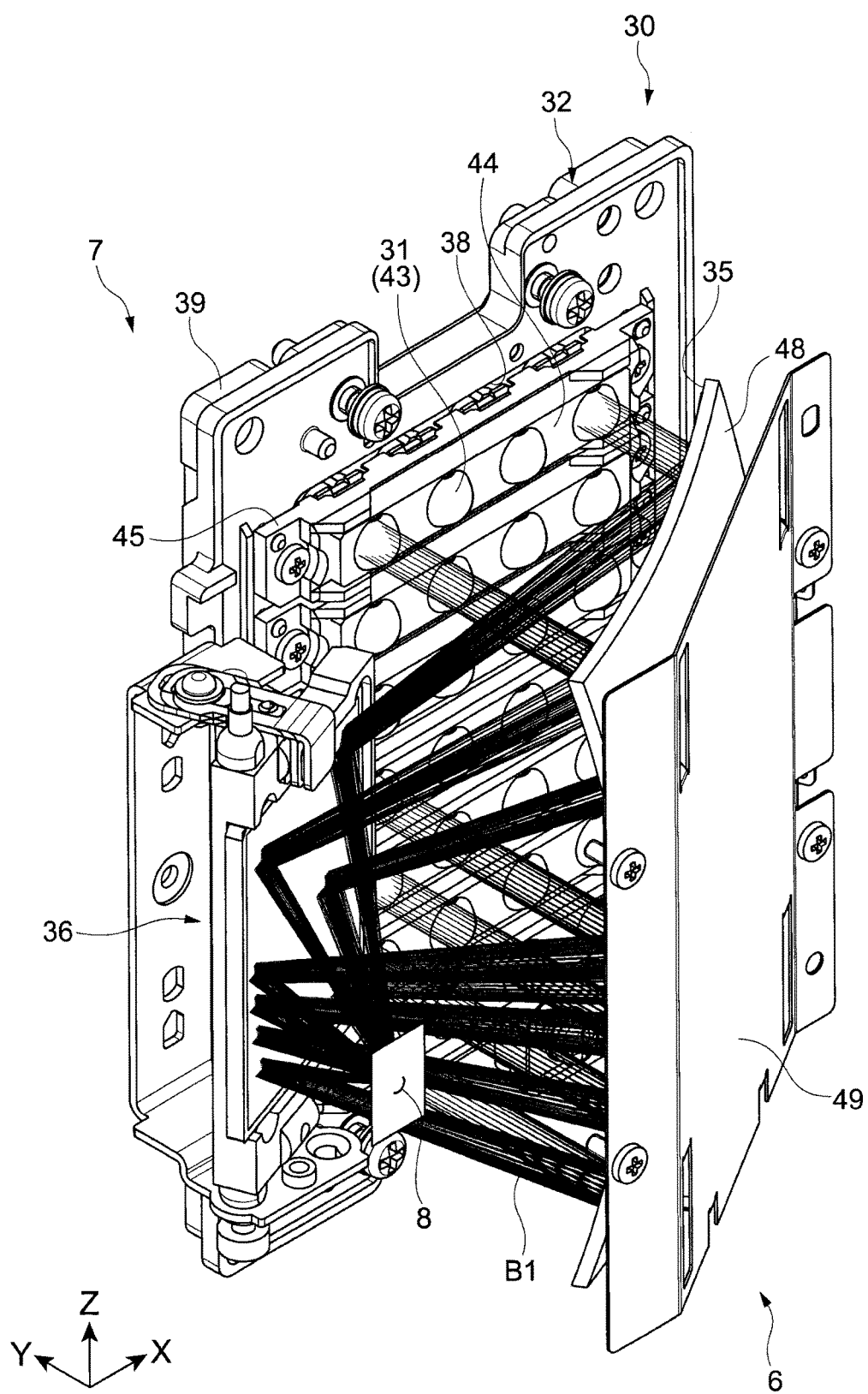
FIG. 5 is a perspective view showing a configuration example of the light collecting unit.
Figure 6:
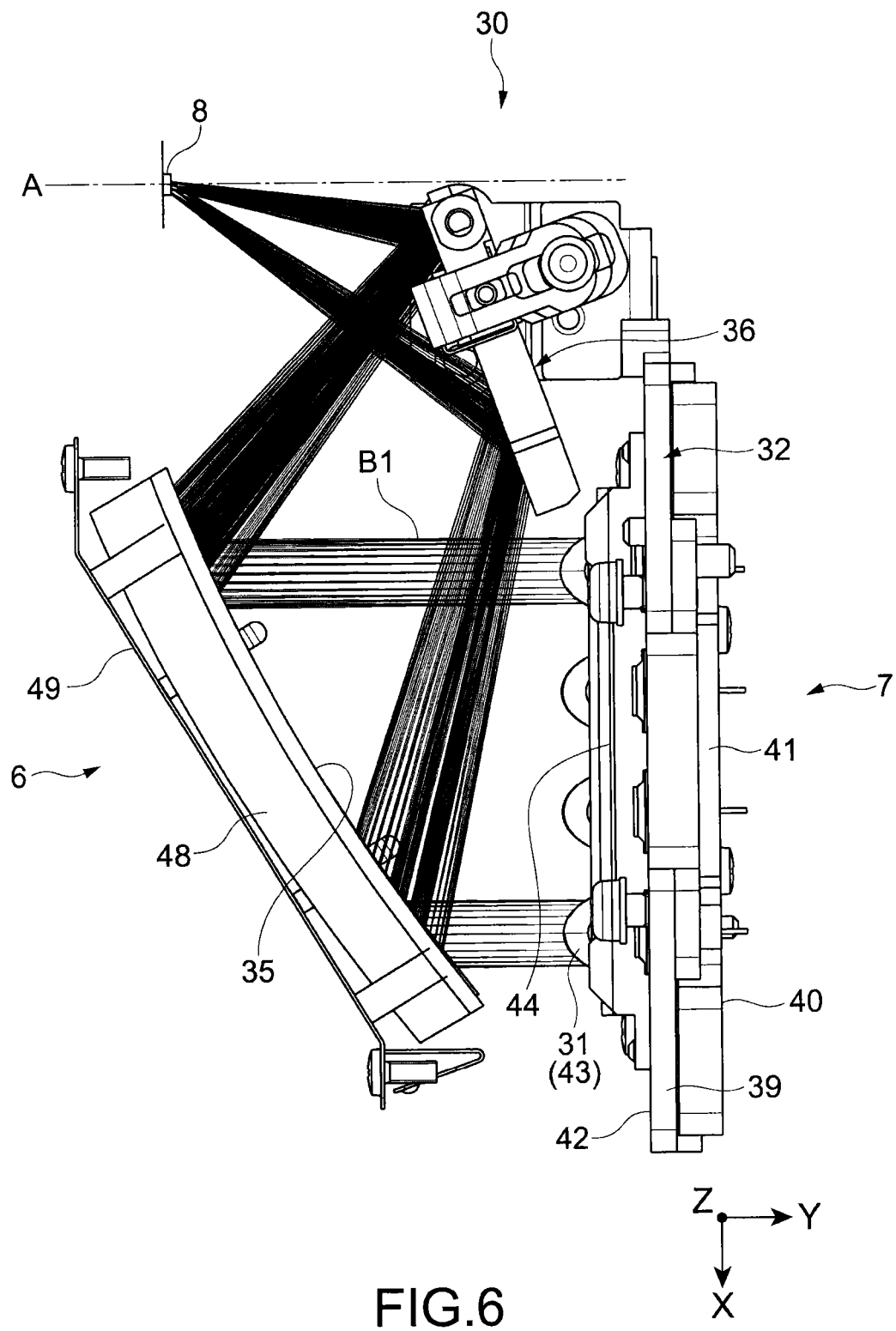
FIG. 6 is a plan view of the light collecting unit shown in FIG. 5, viewed from above.

FIGS. 4 and 5 are perspective views each showing a configuration example of the light collecting unit 30. In FIG. 5, the illustration of the support portion 33 is omitted. FIG. 6 is a plan view of the light collecting unit 30 shown in FIG. 5, viewed from above.

As described above, the light collecting unit 30 includes the light source portion 32, the aspheric reflecting surface 35, the planar reflecting portion 36, and the support portion 33 that supports those light source portion 32, aspheric reflecting surface 35, and planar reflecting portion 36 as one unit. The shape or size of the support portion 33 is not limited as long as the support portion 33 can integrally support those components as one unit. Typically, a casing-shaped support portion 33 is used in order to prevent the blue laser light B1 from being leaked to the outside. Thus, use efficiency of the blue laser light B1 is improved.

As shown in FIG. 5, in this embodiment, a laser light source array including the 28 laser light sources 31 is used as the light source portion 32. The light source portion 32 includes a plate-like frame 39 in which an opening 38 is formed. A mount substrate 41 onto which the plurality of laser light sources 31 are mounted is arranged on a rear surface 40 of the frame 39 (on the surface on the rear side 7). The plurality of laser light sources 31 output the blue laser light B1 along the same direction as the optical-axis direction of the optical axis A toward the front side 6 via the opening 38 of the frame 39. The plurality of laser light sources 31 are arranged in a matrix of four in the horizontal direction (x-axis direction) by seven in the height direction (z-axis direction) of the light source apparatus 100.

On the front surface 42 of the frame 39 (on the surface on the front side 6), 28 collimator lenses 43 are arranged to correspond to the positions of the plurality of laser light sources 31. The collimator lens 43 is a rotation symmetric, aspheric lens and converts the blue laser light B1 output from each laser light source 31 into a substantially parallel light flux. In this embodiment, a lens unit 44 is used, in which four collimator lenses 43 linearly arranged are integrally formed. The seven lens units 44 are arranged along the height direction. The lens unit 44 is held with a fixing member 45 that is fixed to the frame 39. It should be noted that the collimator lens 43 is described as the laser light source 31 in the figures in some cases.

The configuration of the light source portion 32 is not limited as long as the blue laser light B1 is output along the same direction as the optical-axis direction of the optical axis A. For example, the frame 39 may not be used. The number of laser light sources 31, the arrangement thereof, the configuration of the collimator lens 43, and the like are also not limited. For example, a collimator lens may be arranged for each laser light source 31 without using the lens unit 44. Alternatively, light fluxes from the plurality of laser light sources 31 may be collected by one collimator lens and converted into a substantially parallel light flux. It should be noted that the figures show part of the light fluxes of the blue laser light B1 output from the plurality of laser light sources 31 (collimator lenses 43).

On the front side 6 of the plurality of laser light sources 31, a reflecting member 48 including the aspheric reflecting surface 35 is arranged. The reflecting member 48 is arranged such that the aspheric reflecting surface 35 is opposed to the plurality of laser light sources 31. The aspheric reflecting surface 35 is arranged obliquely with respect to a planar direction (x-z plane direction) of the arrangement surface 42 that is a surface perpendicular to the optical-axis direction and on which the plurality of laser light sources 31 are arranged. Thus, the blue laser light B1 is reflected toward the planar reflecting portion 36. As the reflecting member 48, for example, a reflective mirror is used.

The aspheric reflecting surface 35 is typically a concave reflecting surface like a mirror surface, and the shape thereof is designed so as to reflect and collect the blue laser light B1 from the plurality of laser light sources 31. The material of the reflecting member 48 is not limited, and a metal material and glass are used therefor, for example.

Figure 7:
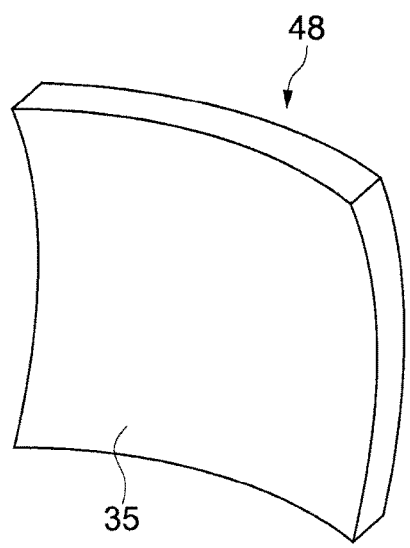
FIG. 7 is a schematic view showing an example of a reflecting member.
Figure 8:
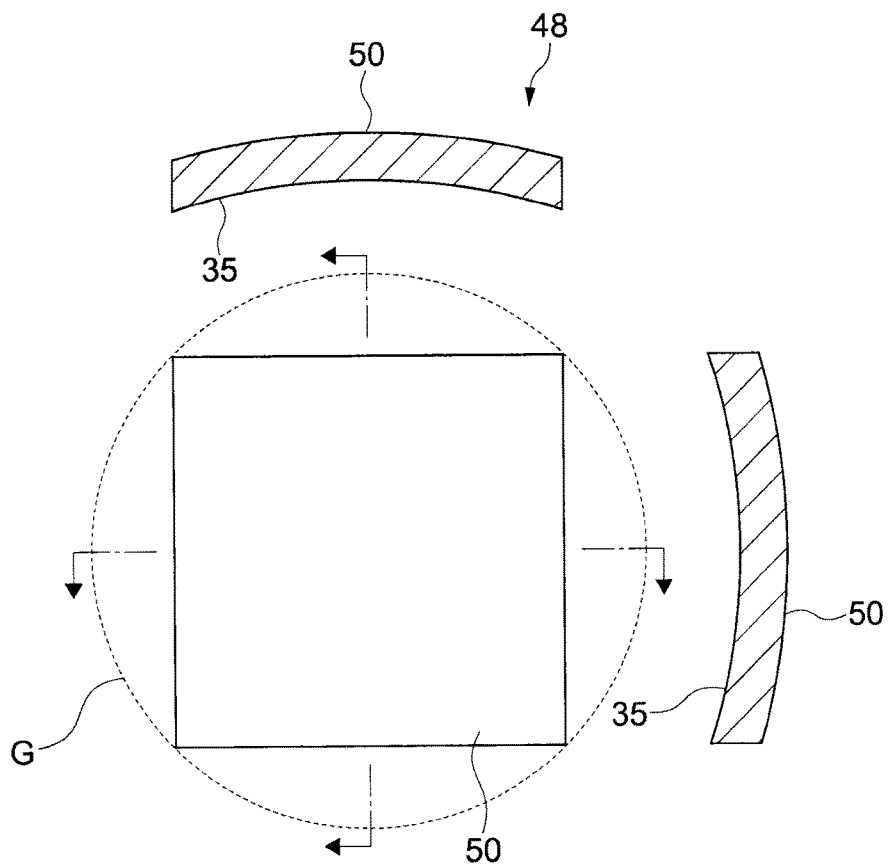
FIG. 8 is a schematic view showing an example of the reflecting member.

FIGS. 7 and 8 are schematic views each showing an example of the reflecting member 48. The aspheric reflecting surface 35 of the reflecting member 48 may be a rotation symmetric, aspheric surface or a free-form surface having no axis of rotational symmetry. The shape of the aspheric reflecting surface 35 is set appropriately based on the positions of the plurality of laser light sources 31, a direction in which light is reflected, and a position at which light is collected, the level of the light flux of the laser light B1 input to the aspheric reflecting surface 35, an incident angle, and the like.

FIG. 8 is a view showing the reflecting member 48, viewed from the side of a back surface 50, which is the side opposite to the aspheric reflecting surface 35. Further, FIG. 8 also shows cross-sectional views of the reflecting member 48 taken along directions substantially perpendicular to each other. As shown in FIG. 8, the reflecting member 48 has a substantially rectangular outer shape when viewed from the side of the back surface 50 (hereinafter, the outer shape viewed from the side of the back surface 50 is simply referred to as an outer shape). Further, the reflecting member 48 has a cross section whose shape is formed to correspond to the shape of the aspheric reflecting surface 35.

For example, the outer shape of the reflecting member 48 can be appropriately changed in accordance with the size of an area to which the blue laser light B1 converted into a substantially parallel light flux by the collimator lens 43 is applied. For example, as shown in FIG. 8, the substantially rectangular reflecting member 48 may be used. Alternatively, a reflecting member 48 having a triangular shape or another multiangular shape, and the like may be used. Thus, compared with the case where a light collecting lens is used to collect the light from the plurality of laser light sources 31, the outer shape of the reflecting member 48 can be appropriately adjusted to be made smaller.

For example, it is assumed that the blue laser light B1 is applied to the entire aspheric reflecting surface 35 of the reflecting member 48 shown in FIG. 8. In this case, when the blue laser light B1 is intended to be collected using the light collecting lens, a lens with such a size that covers at least the outer shape of the reflecting member 48 (see circle G indicated by a broken line of FIG. 8) is necessary. Further, the thickness of the reflecting member 48 (see the cross-sectional views of FIG. 8) can also be reduced compared with the case of using the light collecting lens. As a result, it is possible to produce a compact light collecting optical system 34 and suppress an increase in size of the light source apparatus 100. Further, it is clearly found that a reflecting surface having a shape of a paraboloidal surface is more suitable for a small-sized light collecting optical system than a generally-used refracting system including lenses, also in terms of an optical system of a telescope.

As shown in FIG. 6, the reflecting member 48 is supported by a support member 49. As shown in FIG. 4, the support member 49 is fixed to the support portion 33 by screw clamp. Thus, the reflecting member 48 is supported by the support portion 33.

Figure 9:
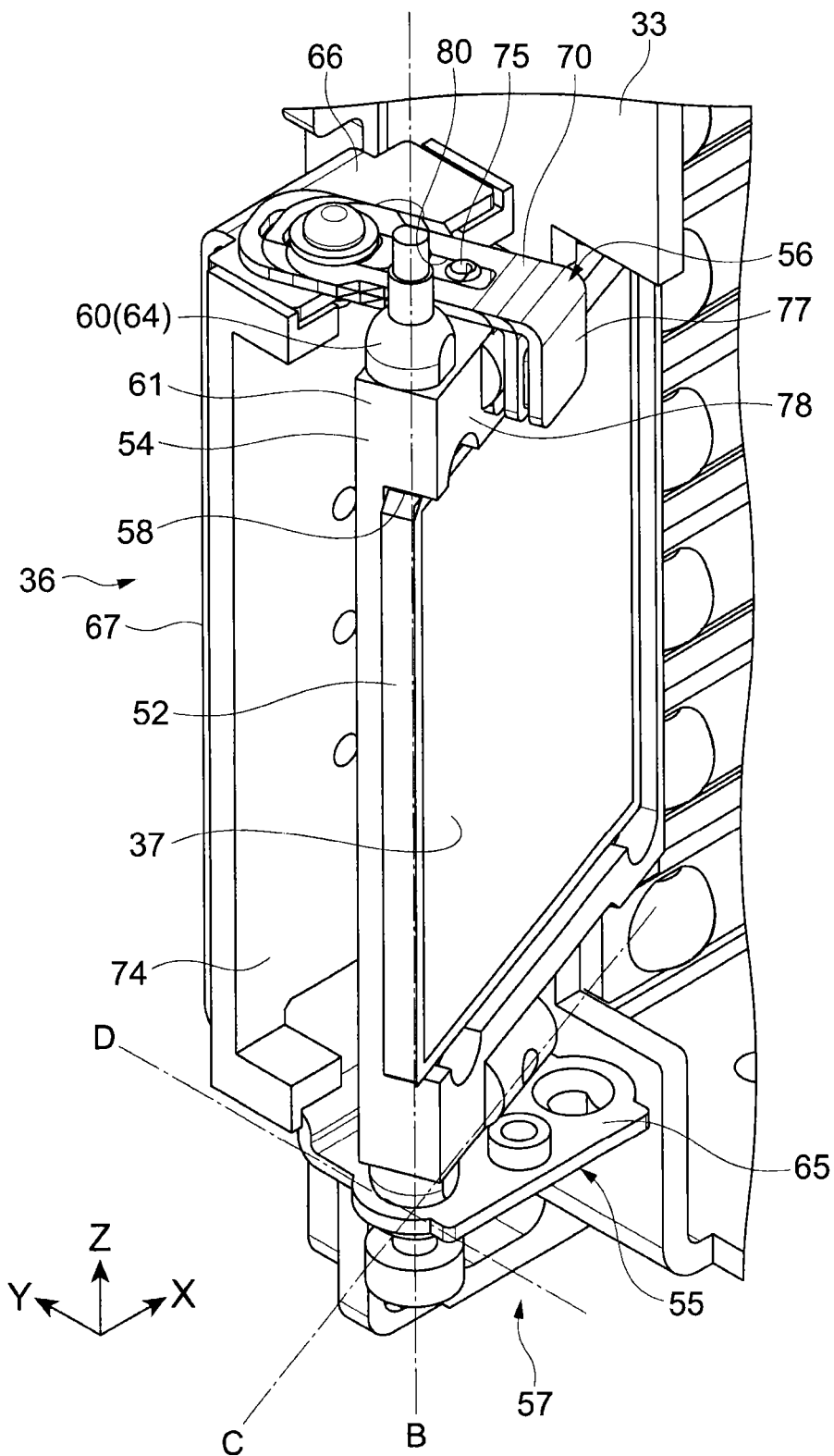
FIG. 9 is an enlarged view of a planar reflecting portion supported by a support portion.
Figure 10:
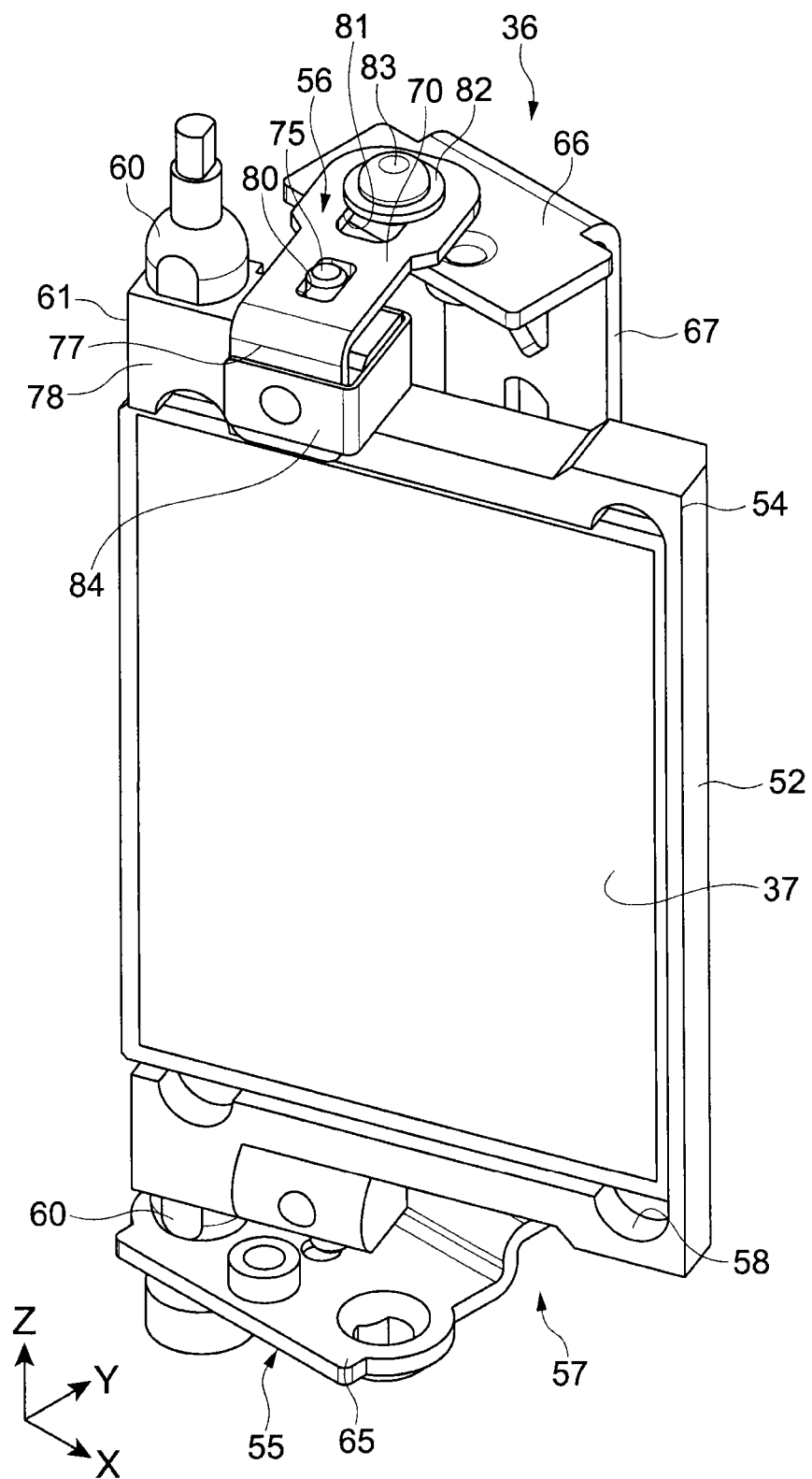
FIG. 10 is a view showing a configuration example of the planar reflecting portion.

FIG. 9 is an enlarged view of the planar reflecting portion 36 supported by the support portion 33. FIG. 10 is a view showing a configuration example of the planar reflecting portion 36.

The planar reflecting portion 36 includes a planar reflecting member 52 including the planar reflecting surface 37. The planar reflecting surface 37 reflects the blue laser light B1, which is reflected on the aspheric reflecting surface 35, to the predetermined point 8 of the phosphor layer 22. Typically, the planar reflecting surface 37 is a mirror surface. As the planar reflecting member 52, for example, a reflective mirror is used. The material of the planar reflecting member 52 is not limited, and a metal material and glass are used therefor, for example.

Further, the planar reflecting portion 36 includes a member holding portion 54, a support frame 55, and a coupling portion 56. The member holding portion 54 holds the planar reflecting member 52. The support frame 55 supports the lower portion of the member holding portion 54 so as to be rotatable and tiltable. The coupling portion 56 couples the member holding portion 54 and the support frame 55 to each other at the upper portion of the member holding portion 54. In this embodiment, the member holding portion 54, the support frame 55, and the coupling portion 56 form an adjustment mechanism 57 that adjusts a position and an angle of the planar reflecting surface 37.

As shown in FIGS. 9 and 10, the member holding portion 54 has a plate shape and includes a concave portion 58 that is formed on an almost entire area of one surface thereof. The plate-like planar reflecting member 52 is fitted into the concave portion 58. The member holding portion 54 is vertically provided along the height direction (z-axis direction). A normal direction of the surface on which the concave portion 58 is formed, that is, a normal direction of the planar reflecting surface 37 is a direction perpendicular to the z axis.

Shaft portions 60 extending in the z-axis direction are formed at end portions of the member holding portion 54. The shaft portions 60 are formed integrally with the member holding portion 54, and for example, when the shaft portions 60 rotate, the member holding portion 54 also rotates. So, the planar reflecting member 52 supported by the member holding portion 54 also moves integrally with the shaft portions 60. In other words, the member holding portion 54 holds the planar reflecting surface 37 integrally with the shaft portions 60.

As shown in FIGS. 9 and 10, the shaft portions 60 are formed at the upper and lower portions of the member holding portion 54 so as to be arranged linearly. At the upper and lower portions of the member holding portion 54, attachment portions 61 are formed, which will be described later. The shaft portions 60 are formed on the attachment portions 61. The attachment portions 61 formed at the upper and lower portions have the same shape. The shaft portions 60 formed at the upper and lower portions have the same shape.

One of the two shaft portions 60 is inserted into a shaft support hole 63 that is formed in the support frame 55. The other shaft portion 60 is used as an operation portion 64 that is operated when an angle of the planar reflecting surface 37 is adjusted. The coupling portion 56 is attached to the attachment portion 61 on the side of the operation portion 64. For example, the shaft portion 60 to be inserted into the shaft support hole 63 is appropriately selected based on a position at which the planar reflecting surface 37 is arranged, a design of the light collecting unit 30, and the like.

When the member holding portion 54 is formed, the shaft portions 60 having the same shape are formed at the upper and lower portions of the member holding portion 54. In other words, since the shaft portion 60 and the operation portion 64 are formed into the same shape without discriminating therebetween, manufacturing costs of the member holding portion 54 can be lowered. Further, since the shaft portion 60 to be inserted into the shaft support hole 63 can be selected, the degree of freedom on the attachment of the member holding portion 54 can be increased.

The support frame 55 includes a lower support portion 65, an upper support portion 66, and a coupling frame 67 that couples those lower support portion 65 and upper support portion 66. The lower support portion 65 and the upper support portion 66 are arranged at positions substantially equal to the lower portion and the upper portion of the member holding portion 54, respectively, in the z-axis direction so as to be opposed to each other. The coupling frame 67 extends along the z-axis direction and couples the lower support portion 65 and the upper support portion 66.

The shaft support hole 63 that supports the shaft portion 60 of the member holding portion 54 is formed in the lower support portion 65. The shaft portion 60 is inserted into the shaft support hole 63, and thus the member holding portion 54 is supported so as to be rotatable and tiltable. Hereinafter, the shape of the shaft support hole 63 and that of the shaft portion 60 will be described in detail.

FIG. 11 is a view showing the shaft support hole 63 formed in the lower support portion 65 of the support frame 55. FIG. 11(A) is a perspective view of the lower support portion 65, and FIG. 11(B) is a plan view of the shaft support hole 63 viewed from above.

As shown in FIG. 11, the shaft support hole 63 is formed at an end portion in the x-axis direction of the lower support portion 65. The shaft support hole 63 is formed of a concave portion 68 (spherical support) and an oval through-hole 69. The concave portion 68 is formed to have a substantially spherical shape. The oval through-hole 69 is formed on the bottom portion of the concave portion 68. The concave portion 68 is formed into a substantially hemispherical shape. Further, the oval through-hole 69 is formed such that a long axis l thereof coincides with the y-axis direction, which is the front-back direction of the light source apparatus 100. A short axis s of the oval through-hole 69 coincides with the x-axis direction, which is the horizontal direction of the light source apparatus 100.

Figure 12:
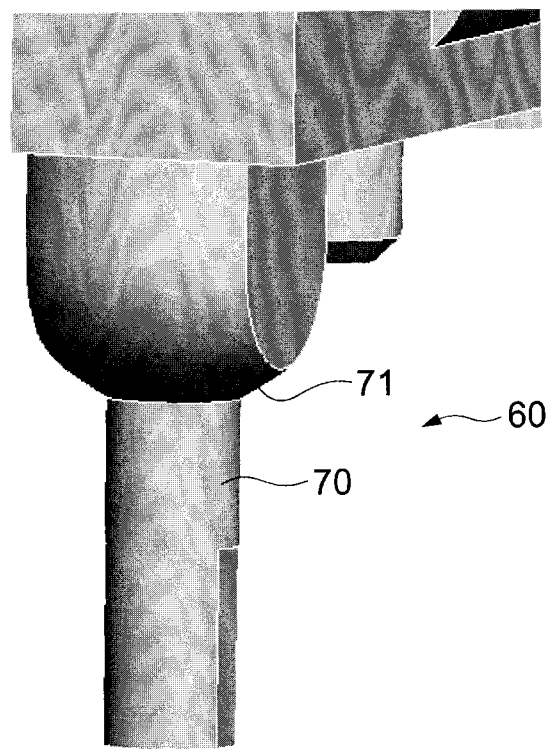
FIG. 12 is a perspective view showing a shaft portion that is inserted into the shaft support hole.

FIG. 12 is a perspective view showing the shaft portion 60 to be inserted into the shaft support hole 63. The shaft portion 60 includes an insertion part 70 and a sphere portion 71. The insertion part 70 has a circular cross section. The sphere portion 71 is formed at the upper portion of the insertion part 70. The insertion part 70 has a cross section whose diameter is substantially equal to the short axis s of the through-hole 69 of the shaft support hole 63. The sphere portion 71 has a substantially hemispherical shape that corresponds to the shape of the concave portion 68 of the shaft support hole 63. The insertion part 70 is inserted into the through-hole 69 so at to be rotatable. At that time, the sphere portion 71 is supported by the concave portion 68 of the shaft support hole 63 so as to be movable.

Figure 13:
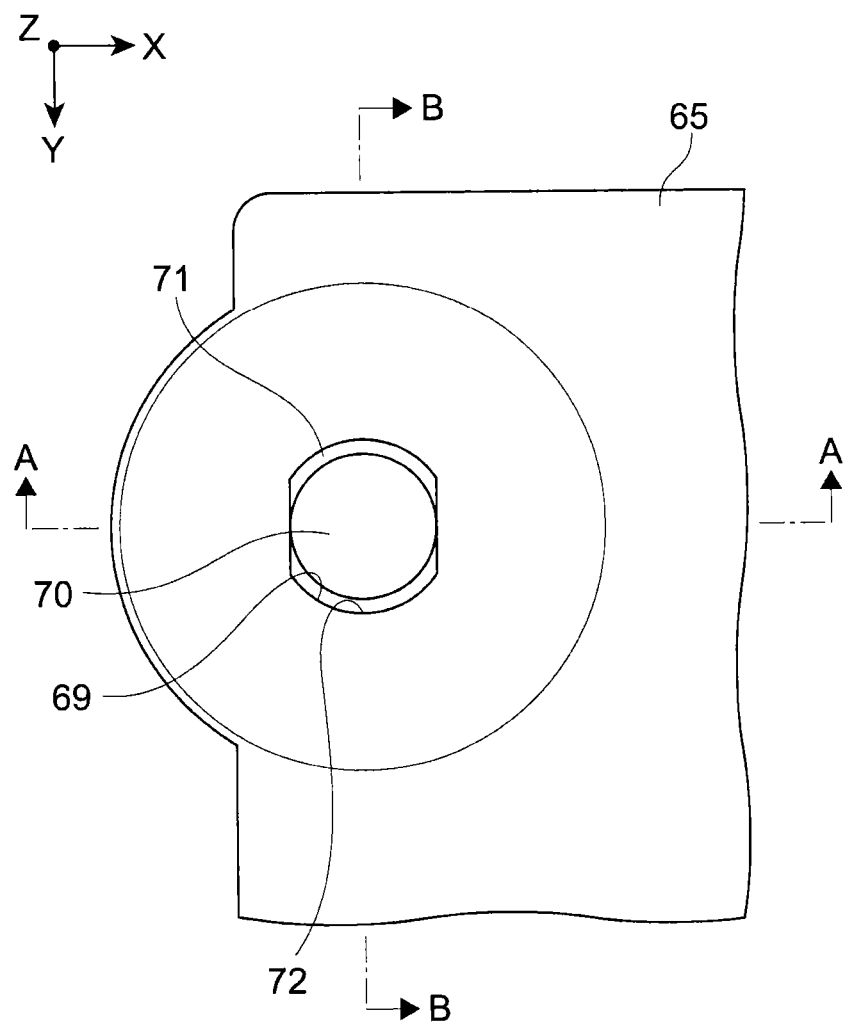
FIG. 13 is a view showing a state where an insertion part of the shaft portion is inserted into a through-hole of the shaft support hole.
Figure 14:
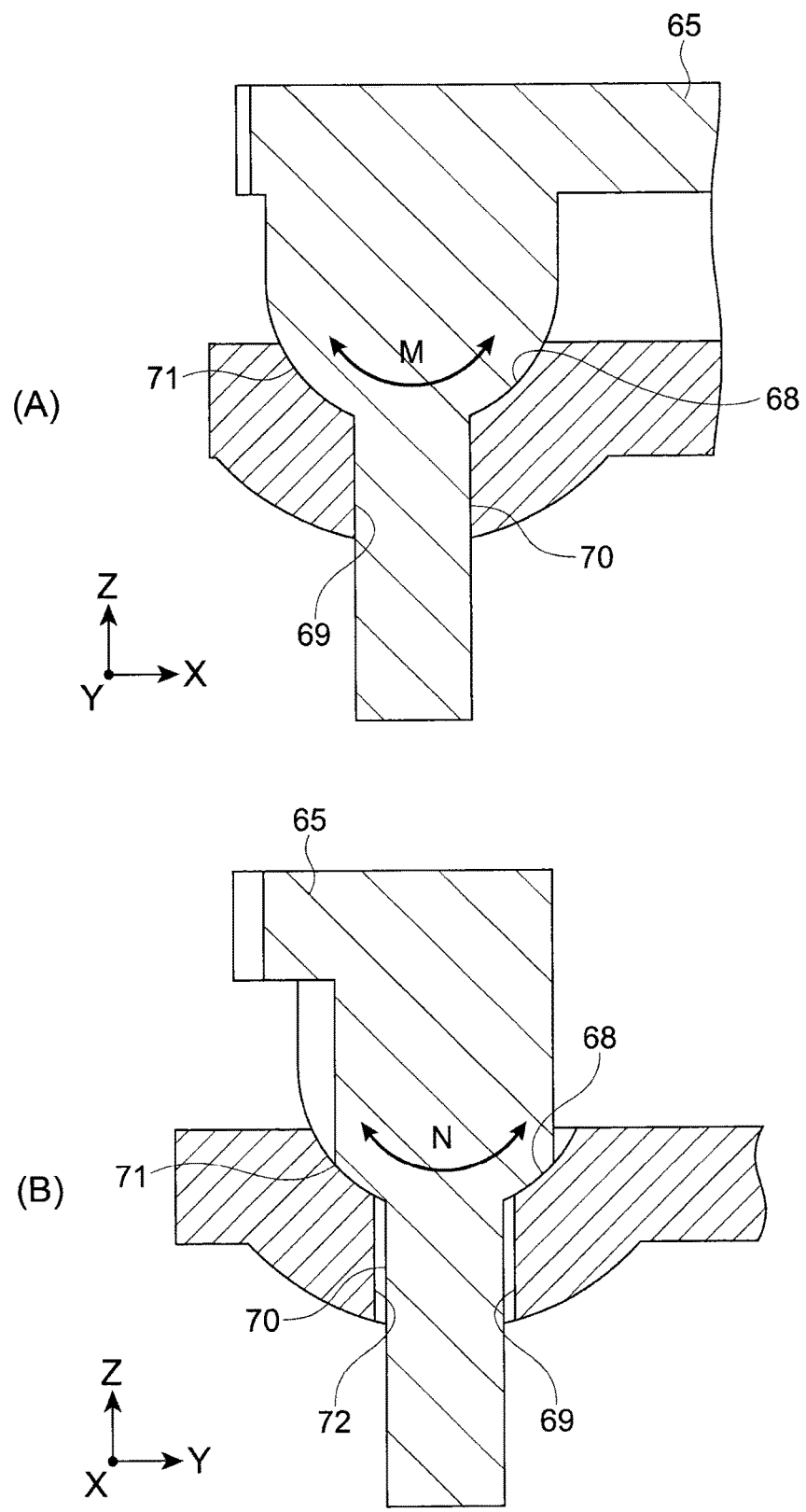
FIG. 14 is a cross-sectional view showing a state where the insertion part is inserted.

FIG. 13 is a view showing a state where the insertion part 70 of the shaft portion 60 is inserted into the through-hole 69 of the shaft support hole 63. FIG. 13 is a view showing such a state viewed from below the lower support portion 65. FIG. 14 is a cross-sectional view showing a state where the insertion part 70 is inserted. FIG. 14(A) is a cross-sectional view taken along the line A-A of FIG. 13, and FIG. 14(B) is a cross-sectional view taken along the line B-B of FIG. 13.

In FIG. 13, a circular portion within the through-hole 69 is the insertion part 70. A gap between the insertion part 70 and the through-hole 69 is the sphere portion 71 of the shaft portion 60 that is placed on the concave portion 68. In other words, a gap 72 of FIG. 13 corresponds to a gap 72 of FIG. 14(B).

As shown in FIG. 14(A), in the short-axis direction (x-axis direction) of the through-hole 69, there is no gap between the insertion part 70 of the shaft portion 60 and the through-hole 69. So, it is impossible to tilt the shaft portion 60 along the x-axis direction. In other words, it is impossible to rotate the sphere portion 71 with respect to the concave portion 68 in a direction of the arrow M shown in FIG. 14(A).

On the other hand, as shown in FIG. 14(B), in the long-axis direction (y-axis direction) of the through-hole 69, the gap 72 exists between the insertion part 70 of the shaft portion 60 and the through-hole 69. So, within the range in which the shaft portion 60 and the through-hole 69 come into contact with each other, the shaft portion 60 can be tilted along the y-axis direction. In other words, it is possible to rotate the sphere portion 71 with respect to the concave portion 68 in a direction of the arrow N shown in FIG. 14(B).

As described above, in this embodiment, the shaft support hole 63 including the spherical concave portion 68 and the oval through-hole 69 is formed in the lower support portion 65. Then, the insertion part 70 to be inserted into the through-hole 69 and the sphere portion 71 to be supported by the concave portion 68 are formed in the shaft portion 60. Thus, the lower support portion 65 can support the shaft portion 60 so as to be rotatable and tiltable.

In other words, in this embodiment, a biaxial drive mechanism is achieved as shown in FIG. 10. Specifically, the biaxial drive mechanism includes a rotary drive system in which the shaft portion 60 (axis B) is used as a rotating shaft, and a rotary drive system (tilt drive system) in which an axis C with the shaft support hole 63 being as a reference is used as a rotating shaft. Thus, in the rotation direction and the tilt direction of the shaft portion 60, an angle of the planar reflecting surface 37 can be adjusted. It should be noted that the tilt direction is the y-axis direction, which is a direction of the long axis 1 of the through-hole 69, but a tilt direction along the coupling portion 56, which will be described later, is a rotation direction in which the axis C is used as a rotating shaft.

It should be noted that as shown in FIG. 11 and the like, another shaft support hole 63 is formed in the other end portion of the lower support portion 65. In such a way, the plurality of shaft support holes 63 may be formed, and a shaft support hole 63 into which the shaft portion 60 is to be inserted may be appropriately selected based on the position at which the planar reflecting surface 37 is arranged, for example. Thus, the degree of freedom on the design of the light collecting unit 30 can be increased.

The length of the long axis 1 of the through-hole 59 may be set in accordance with an angle at which the shaft portion 60 is tilted. As the long axis 1 becomes longer, a tiltable angle also becomes larger. When the long axis 1 is short, the tiltable angle is small. In this embodiment, the long axis 1 is set to coincide with the y-axis direction. This allows the shaft portion 60 to be tilted in the y-axis direction. Though not limited to the case where the tilt direction is set to be the y-axis direction, the direction of the long axis 1 may be appropriately set. Thus, a tiltable direction can also be appropriately set.

It should be noted that a configuration for supporting the shaft portion 60 so as to be rotatable and tiltable is not limited to the above configuration, and any configuration may be adopted. Further, the material of the support frame 55 including the lower support portion 65 or the material of the member holding portion 54 including the shaft portion 60, and the like are also not limited to the above materials, and metal, plastic, and the like may be appropriately used therefor.

As shown in FIG. 9, the support frame 55 is supported by a frame support portion 74. The frame support portion 74 is included in the support portion 33 that supports the planar reflecting portion 36 and the like as one unit. In this embodiment, the support frame 55 is supported so as to be movable with respect to the frame support portion 74 in the front-back direction (y-axis direction) of the light source apparatus 100. When the support frame 55 is moved in the y-axis direction, the member holding portion 54 and the support frame 55 are integrally moved. Thus, the position of the planar reflecting surface 37 is adjusted.

The configuration of a movement mechanism for allowing the support frame 55 to be movable is not limited. For example, guide portions or the like that guide the support frame 55 are formed in the upper and lower portions of the frame support portion 74. Alternatively, a movement mechanism may be configured by appropriately using a spring member or the like that exerts an elastic force in a movement direction. In addition thereto, any configuration may be adopted. By the movement mechanism, a linear drive mechanism with an axis D being as a drive axis is achieved.

With reference to FIGS. 9 and 10, the coupling portion 56 will be described. As described above, the coupling portion 56 is attached to the attachment portion 61 formed at the upper portion of the member holding portion 54. At the upper portion of the attachment portion 61, the operation portion 64 (shaft portion 60) and a protrusion portion 75 located adjacent to the operation portion 64 are formed.

As shown in FIG. 9 and the like, the coupling portion 56 is an L-shaped member in which one end portion of an oblong plate member is folded by approximately 90 degrees. The coupling portion 56 includes a planar portion 76 and a tip end portion 77 that is folded by approximately 90 degrees with respect to the planar portion 76. The coupling portion 56 is arranged such that the planar portion 76 is located on the attachment portion 61 and the upper support portion 66 of the support frame 55. Further, the coupling portion 56 is arranged such that the tip end portion 77 is located on the side of a front surface 78 of the attachment portion 61.

An opening 80 is formed substantially at the center of the planar portion 76 along the longitudinal direction thereof. The protrusion portion 75 formed on the attachment portion 61 is inserted into the opening 80 so as to be movable within the opening 80. An opening 81 is also formed along the longitudinal direction of the planar portion 76 at an end portion thereof on the side opposite to the tip end portion 77. A screw 83 is mounted into the opening 81 via a washer 82. The coupling portion 56 and the upper support portion 66 of the support frame 55 are connected to each other via the screw 83.

The position and angle of the planar reflecting surface 37 are adjusted with the screw 83 being temporarily jointed. By the rotation of the operation portion 64, the angle of the planar reflecting surface 37 about the shaft portion 60 is adjusted. Thus, the position of the light collecting point 8 in the horizontal direction can be adjusted. Further, the operation portion 64 is moved in the front-back direction so as to tilt the shaft portion 60, and thus the tilt of the planar reflecting surface 37 can be adjusted. Thus, the position of the light collecting point 8 in the height direction can be adjusted. Further, the position of the support frame 55 in the front-back direction is adjusted, and thus a focus position of the light collecting point 8 can be adjusted.

Along with those adjustments, the coupling portion 56 is moved. For example, a relative position of the protrusion portion 75 with respect to the opening 80 formed in the planar portion 76 is changed. Further, a relative position of the screw 83 with respect to the opening 81 is changed (see movement of the coupling portion 56 of FIG. 9). Furthermore, the coupling portion 56 is moved also in a rotation direction about the screw 83. Movement amounts of the respective components are changed depending on the way of adjustment.

When the adjustments are finished, the screw 83 is fastened so that the coupling portion 56 and the upper support portion 66 are fixed to the frame support portion 74. Further, as shown in FIG. 10, a fixing member 84 is provided to sandwich the tip end portion 77 of the coupling portion 56 and a rear surface of the attachment portion 61. Thus, the member holding portion 54 is fixed at a predetermined position and angle. As a result, the planar reflecting surface 37 is fixed at a predetermined position and angle. It should be noted that a method of fixing the member holding portion 54 is not limited.

Here, a specific example of the light collecting unit according to this embodiment will be described. In the following description on the example, xyz coordinates to be used are set in directions different from those described above.

Figure 15:
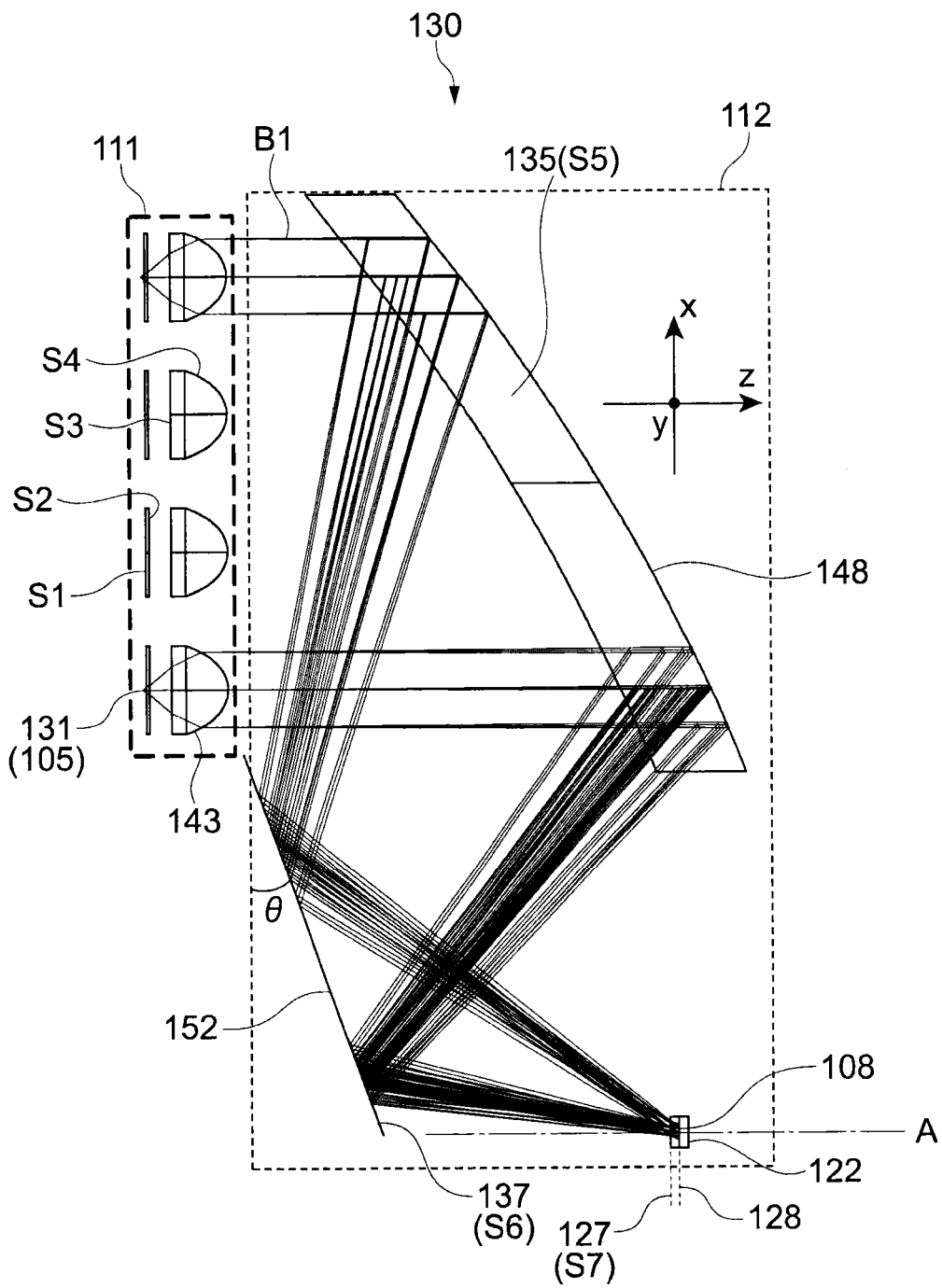
FIG. 15 is a view showing a configuration of a light collecting unit as a specific example.
Figure 16:
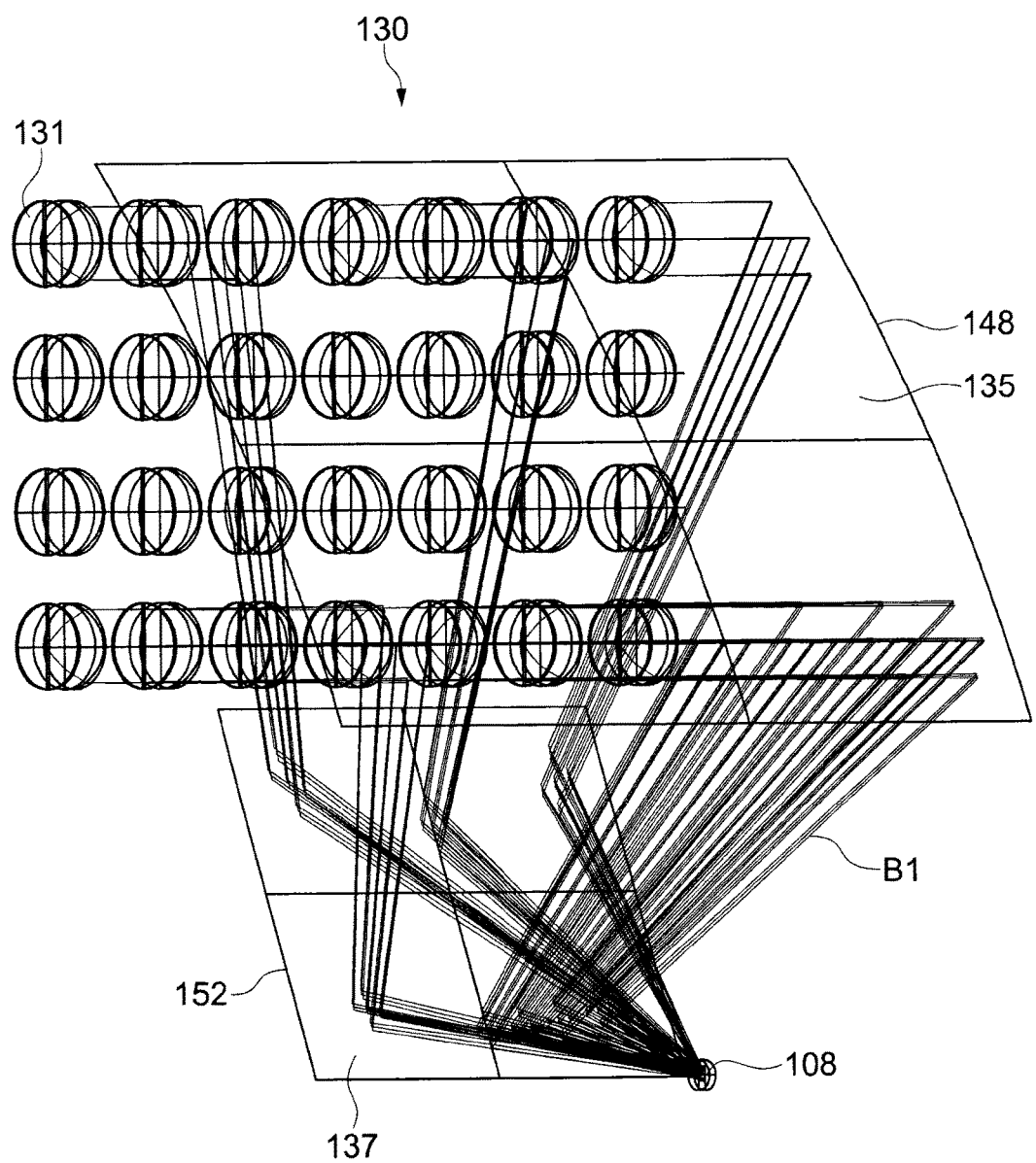
FIG. 16 is a view showing a configuration of the light collecting unit in the example.

FIGS. 15 and 16 are views each showing a configuration of a light collecting unit 130 according to this example. FIG. 16 is a view of the light collecting unit 130 viewed obliquely from the rear surface side of a plurality of laser light sources 131.

As shown in FIGS. 15 and 16, light fluxes from the plurality of laser light sources 131 are converted into substantially parallel light fluxes by collimator lenses 143 provided to the respective laser light sources 131. Blue laser light B1 converted into the substantially parallel light flux travels along the same direction as the optical-axis direction of the optical axis A and is reflected on an aspheric reflecting surface 135 of a reflecting member 148 to be collected. The blue laser light B1 reflected on the aspheric reflecting surface 135 is then reflected on a planar reflecting surface 137 and collected to a predetermined light collecting point 108 on a phosphor layer 122.

Figure 17:
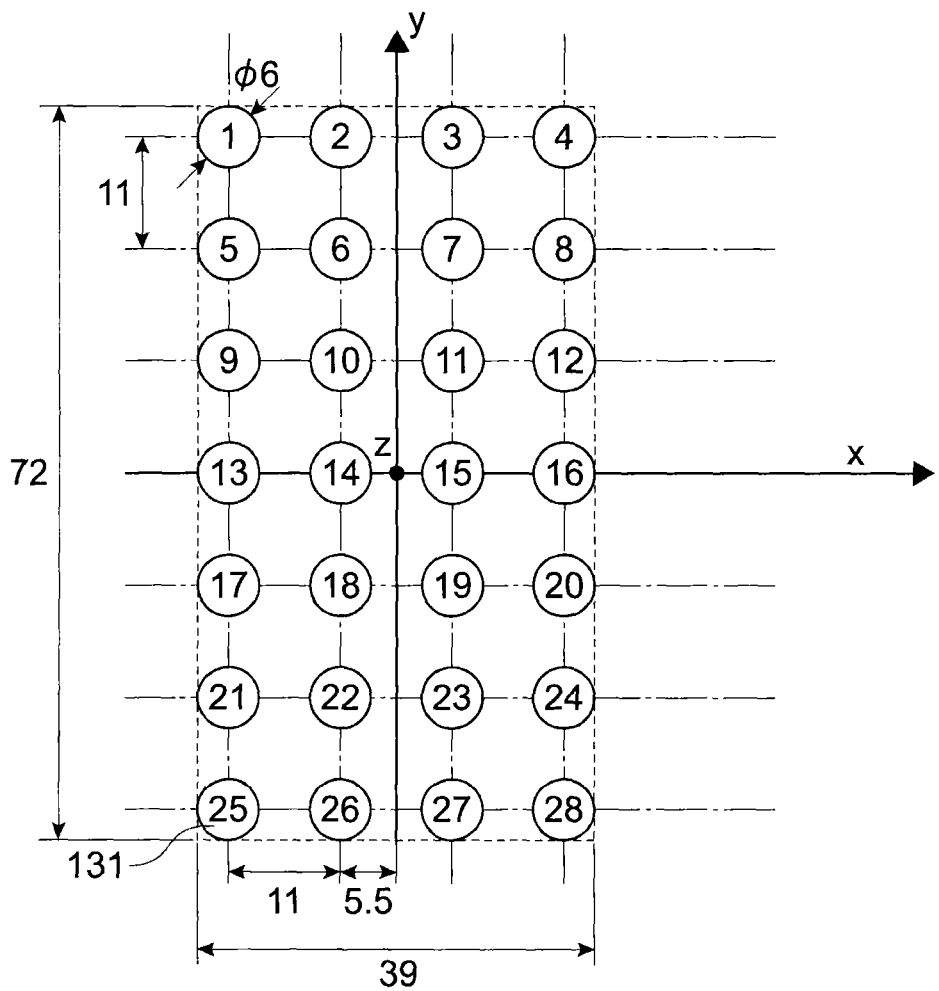
FIG. 17 is a view showing the number of laser light sources and arrangement positions thereof in the example.

FIG. 17 is a view showing the number of laser light sources 131 and arrangement positions thereof. The xyz coordinates shown in FIG. 17 are coordinates corresponding to the xyz coordinates shown in FIG. 15. As shown in FIG. 17, in this example, a laser light source array including a total of 28 laser light sources 131 is used. The 28 laser light sources 131 are arranged in a matrix of four laser light sources 131 along the x-axis direction by seven laser light sources 131 along the y-axis direction. It should be noted that the number of laser light sources 131 is not limited.

The laser light sources 131 are arranged at intervals of 11 mm in the x-axis direction and the y-axis direction. The laser light B1 of the substantially parallel light flux output from the collimator lens 143 has a light flux diameter of 6 mm. So, the blue laser light B1 of the substantially parallel light fluxes is applied toward the aspheric reflecting surface 135 in the range of 39 mm in the x-axis direction and 72 mm in the y-axis direction.

FIGS. 18 and 19 are tables each showing data items on the light collecting unit 130. A first optical system in the table refers to an optical system (denoted by reference numeral 111 of FIG. 15), in which the light fluxes of the blue laser light B1 output from the plurality of laser light sources 131 are converted into substantially parallel light fluxes. The optical system including the plurality of collimator lenses 143 corresponds to the first optical system 111. A second optical system refers to an optical system (denoted by reference numeral 112 of FIG. 15) for collecting the blue laser light B1 from the plurality of laser light sources 131, which is converted into the substantially parallel light fluxes by the first optical system 111, to the predetermined point 108. So, the optical system including the aspheric reflecting surface 135 and the planar reflecting surface 137 corresponds to the second optical system 112.

An object side NA in the table refers to a numerical aperture of the collimator lens 143 to the blue laser light B1 from each laser light source 131. A focal length f1 of the first optical system 111 is a focal length of the collimator lens 143 (unit thereof is mm). A focal length f2 of the second optical system 112 is a focal length of the optical system including the aspheric reflecting surface 135 and the planar reflecting surface 137 (unit thereof is mm). However, since the focal length of the planar reflecting surface 137 is infinity, the focal length f2 is a focal length of the aspheric reflecting surface 135.

A first optical surface of the first optical system 111 corresponds to an initial surface of the array and also corresponds to output surfaces of the 28 laser light sources 131. A surface S1 is a surface of a cover glass 105 on the light source side (see FIG. 15). The cover glass 105 covers the laser light source 131. A surface S2 is the other surface of the cover glass 105, that is, a surface on the side from which the laser light B1 is output. A surface S3 is a planar surface of the collimator lens 143 on the side of the laser light source 131. A surface S4 is an aspheric surface of the collimator lens 143 and is to be an end surface of the array. The surfaces S1 to S4 are included in the first optical system 111.

A surface S5 and the following surfaces are included in the second optical system 112. The surface S5 is the aspheric reflecting surface 135 of the reflecting member 148. A surface S6 is the planar reflecting surface 137 of a planar reflecting member 152. The surface S6 is set as an eccentric surface that is eccentric with respect to an x-y plane formed of the x axis and the y axis of FIG. 15. A surface S7 is a surface 127 that is on the side opposite to an arrangement surface 128 on which the phosphor layer 122 is arranged. A second light-source surface of the second optical system 112 is a surface of the phosphor layer 122, to which the blue laser light B1 is input.

The table of FIG. 18 shows a curvature radius (mm) of each surface, an interval (mm) between surfaces, and a refractive index n for blue laser light with a wavelength of 445 nm. The curvature radius and the interval are denoted by symbols of plus and minus with the z axis of FIG. 15 being as a reference. It should be noted that the infinity of the curvature radius means that a surface of the curvature radius is planar. The refractive index n is described for substrates including the cover glass 105, the collimator lens 143, and the arrangement surface 128.

FIG. 19 shows data of the aspheric surfaces of the surface S4 and the surface S5, and data of the surface S6 and the surface S7 that are set to be eccentric. In this embodiment, an aspheric surface is represented by the following equation. It should be noted that in the equation, c represents a curvature, K represents a conic constant, and Ai represents a correction factor.

$$z = \frac{ch^2}{1 + \{1 - (1+K)c^2h^2\}^{1/2}} + \sum_{i=1} A_i h^i \qquad [\text{Math. 1}]$$

The surface S4 as the aspheric surface of the collimator lens 143 is expressed by substituting the conic constant K and the correction factor Ai shown in FIG. 19 into the above equation. Further, the curvature c is obtained from the curvature radius of FIG. 18. The surface S5 as the aspheric reflecting surface is a paraboloidal surface whose conic constant K is −1. The surface S6 as the eccentric surface is eccentric by 40 degrees with respect to the x-y plane shown in FIG. 15 in a clockwise direction about the y axis. The surface S7 is arranged in parallel to the x-y plane without rotating and is shifted in the x-axis direction by 14.97 mm.

For example, the plurality of laser light sources 131, the aspheric reflecting surface 135, and the planar reflecting surface 137 described in this example are supported as one unit by the support portion. This allows the light collecting unit 130 according to the present technology to be achieved.

It should be noted that the specific shapes and numerical values of the respective portions exemplified in this example are mere examples of embodiments for carrying out the present technology, and the technical range of the present technology is not limited by those examples.

Figure 20:
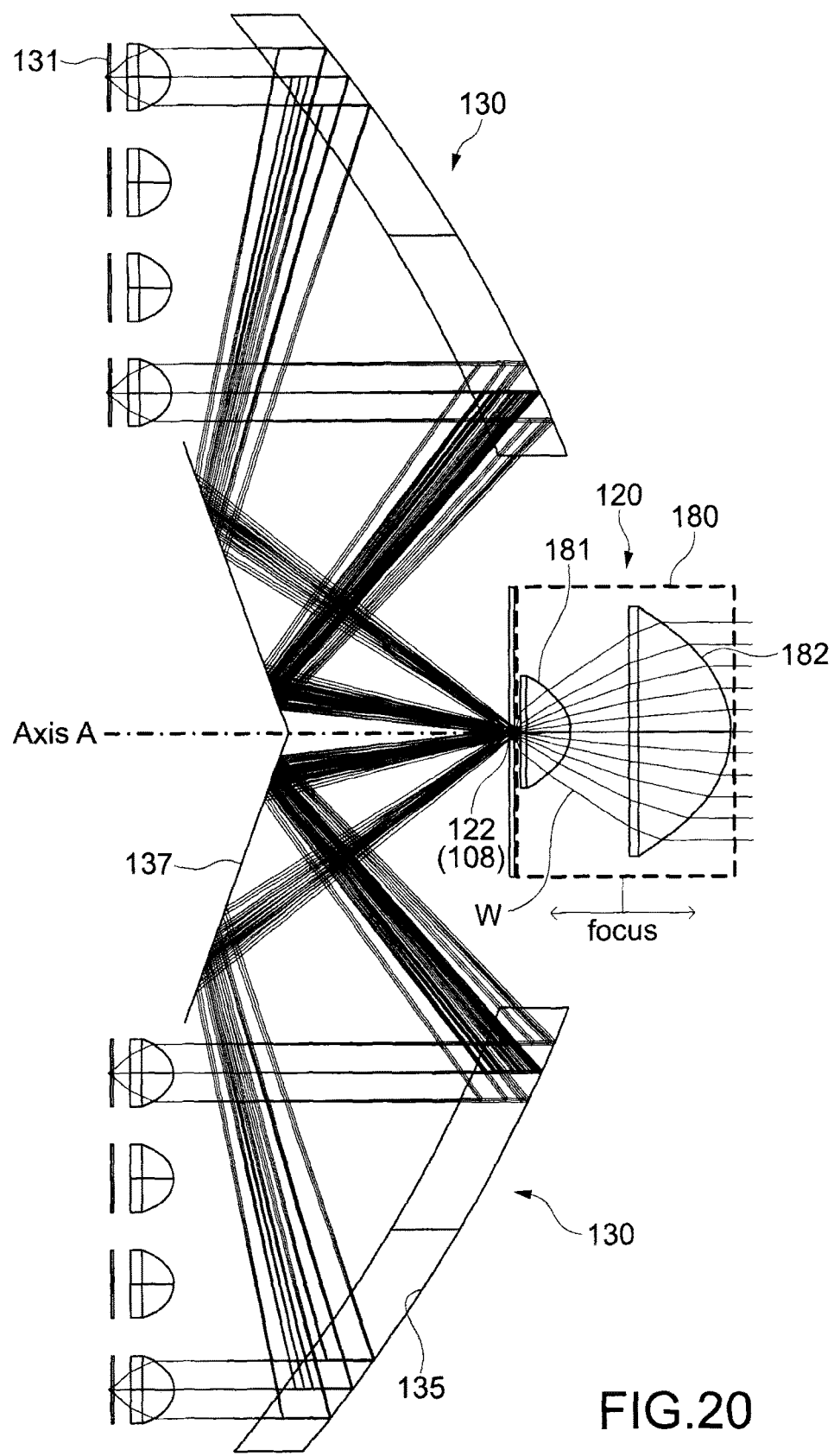
FIG. 20 is a view showing a configuration example in the case where the two light collecting units shown in FIG. 15 are arranged side by side.

FIG. 20 is a view showing a configuration example in the case where the two light collecting units 130 shown in FIG. 15 are arranged side by side. FIG. 20 corresponds to the configuration shown in FIG. 2. The two light collecting units 130 are arranged at respective two positions that are symmetric about the axis A passing through the phosphor layer 122. The axis A corresponds to an optical axis of light output from a phosphor unit 120. With such a configuration, the number of laser light sources 131 is doubled, that is, 56 pieces, and thus a high luminance of white light output from the phosphor layer 122 can be achieved.

It should be noted that the blue laser light B1 from the two light collecting units 130 may be collected at one light collecting point 108. On the other hand, each light collecting point 108 may be set at a different position on the phosphor layer 122. Thus, the deterioration of the phosphor layer 122 can be suppressed.

For example, two light collecting points 108 are set at positions that are different in distance from the rotating shaft of the phosphor wheel. When the phosphor wheel is rotated, the blue laser light B1 is collected on each of two circles with the rotating shaft as the center. Thus, the saturation, burning, and the like of the phosphor can be prevented. This idea can also be applied to a case where the number of light collecting units is increased.

For example, when light coming from the 56 laser light sources 131 is intended to be collected with a light collecting lens, a huge lens is necessary. However, since the light collecting unit 130 including the aspheric reflecting surface 135 is used in this embodiment, an increase in size of the light source apparatus can be suppressed. So, a high luminance can be achieved while an increase in size of the apparatus is suppressed.

It should be noted that the phosphor unit 120 shown in FIG. 20 includes an output optical system 180 in which a light flux of white light W output from the phosphor layer 122 can be converted into a substantially parallel light flux and a focal length is variable.

Figure 29:
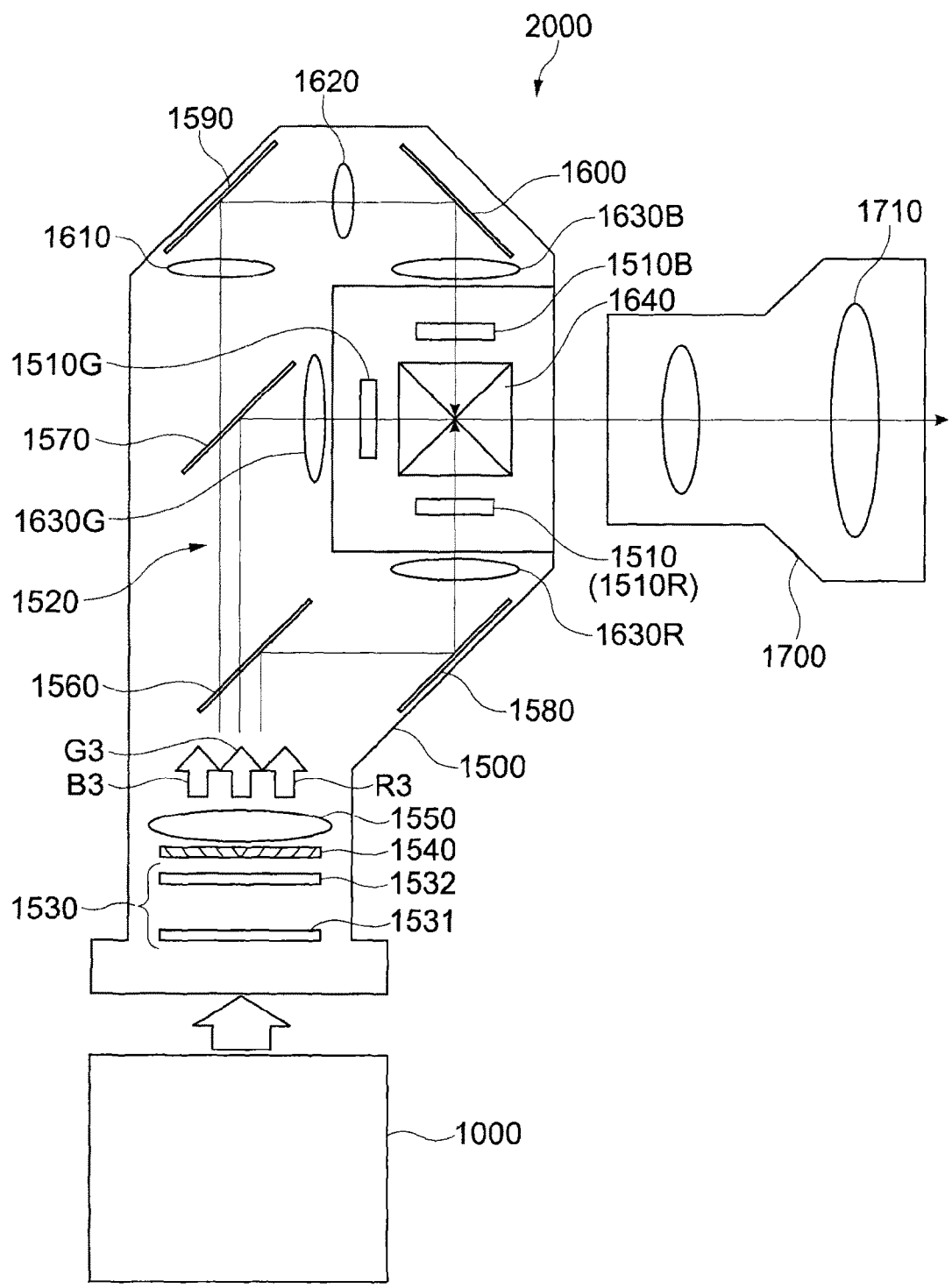
FIG. 29 is a schematic view showing a configuration example of a projector that serves as an image display apparatus according to the present technology.

The output optical system 180 is an optical system for taking in the light flux emitted from the phosphor layer 122 into an illumination system 1500 (see FIG. 29). As shown in FIG. 20, the axis A passing through the phosphor layer 122 is an optical axis of the light collecting unit 130. Light is emitted from the phosphor layer 122 in a substantial lambertian pattern, and the emitted light flux is converted into a substantially parallel light flux by the output optical system 180 and then output to the illumination system 1500.

As described above, the focal length of the output optical system 180 is variable. For example, a focusing mechanism that moves the output optical system 180 in the optical-axis direction is provided. Thus, it is possible to efficiently take in the light flux emitted from the light-emitting source into the illumination system 1500 without deterioration.

In this embodiment, two lenses 181 and 182 form the output optical system 180. However, the configurations of the output optical system 180 and the focusing mechanism are not limited.

As described above, in the light source apparatus 100 according to this embodiment, the plurality of laser light sources 31 are arranged on the rear side of the phosphor unit 20 capable of outputting the light containing the blue laser light B1 and the visible light from the phosphor 22. The blue laser light B1 is output from the plurality of laser light sources 31 in the same direction as the optical-axis direction of the phosphor unit 20. The output blue laser light B1 is collected onto the phosphor 22 of the phosphor unit 20 by the light collecting optical system 34. This allows a space for cooling the plurality of laser light sources 31 to be easily ensured.

Figure 21:
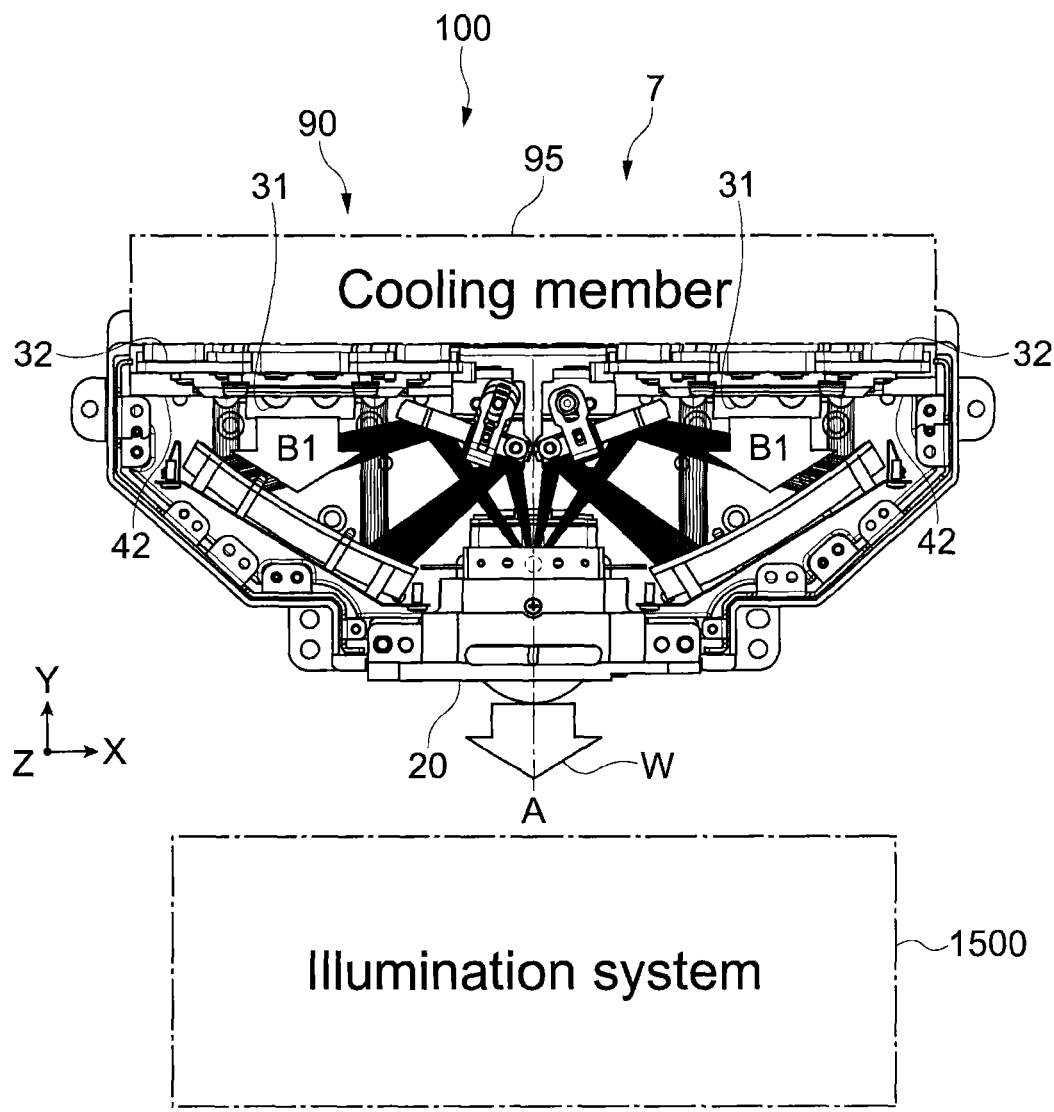
FIG. 21 is a schematic view showing an arrangement example of a cooling device with respect to the light source apparatus shown in FIG. 2.

For example, as shown in FIG. 21, a space 90 on the rear side of the two light source portions 32, that is, a space 90 on the rear side of the arrangement surface 42 on which the plurality of laser light sources 31 are arranged, can be easily ensured as a space for cooling. A cooling member 95 such as a heat sink or a cooling fan is arranged in the space 90, and thus the plurality of laser light sources 31 can be cooled from the rear side 7.

The space 90 on the rear side 7 is located on the opposite side to the position of the illumination system 1500 that receives white light W from the phosphor unit 20. So, the cooling member 95 having a structure adequate to sufficiently cool the light source portions 32 can be arranged without undergoing restrictions resulting from the structure, the arrangement, and the like of the illumination system 1500. As a result, the light source portions 32 can be efficiently cooled. Further, since the arrangement surfaces 42 of the two light source portions 32 are arranged side by side in the horizontal direction, cooling of the two light source portions 32 together using one cooling member 95 can be allowed easily. As a matter of course, a plurality of cooling members may be used.

Further, since the optical-axis direction of the white light W from the phosphor unit 20 and the output direction of the blue laser light B1 from the plurality of laser light sources 31 are the same direction, the handling of the blue laser light B1 is facilitated. For example, in the case where the assembly of the light source apparatus 100, the adjustment of each member, and the like are performed, the traveling direction of the blue laser light B1 can be easily grasped. So, measures for safety such as prevention of the unexpected application of laser light or the like can be easily performed. Further, the output direction of the white light W is matched with the output direction of the blue laser light B1, and thus measures for light shielding against the leakage of light is easily performed.

Further, in this embodiment, the aspheric reflecting surface 35 is used for collecting light to the phosphor 22. This allows the light source apparatus 100 to be made compact. For example, even in the case where the number of laser light sources 31 is increased so as to achieve a high luminance, the size of the light collecting optical system 34 can be prevented from being increased. As a result, it is possible to achieve a high luminance while suppressing the growing in size of the apparatus. Further, using the aspheric reflecting surface 35 allows easy achievement of a structure in accordance with a necessary luminance and shape.

Further, used in this embodiment is the planar reflecting member 52 that reflects the blue laser light B1 toward the phosphor 22, the blue laser light B1 being reflected on the aspheric reflecting surface 35. With such a reflecting member, the degree of freedom on the design of the light collecting optical system 34 can be increased. As a result, the downsizing, a desired shape, and the like of the light source apparatus 100 can be achieved. So, the configuration in which the optical-axis direction of the white light W and the output direction of the blue laser light B1 from the plurality of laser light sources 31 are made the same direction can be easily achieved.

Further, in this embodiment, the plurality of laser light sources 31 and the light collecting optical system 34 are supported as one unit by the support portion 33. So, a plurality of light collecting units 30, each of which is in the form of unit, can be arranged. In other words, it is possible to correspond to a multi-unit configuration. Since the shape and the like of the light collecting unit 30 can be flexibly changed, it is also possible to appropriately combine the light collecting units 30 having various configurations to correspond to various specifications.

<Second Embodiment>

A light source apparatus according to a second embodiment of the present technology will be described. In the description below, description on components having the same configurations and actions in the light source apparatus 100 in the embodiment described above will be omitted or simplified.

Figure 22:
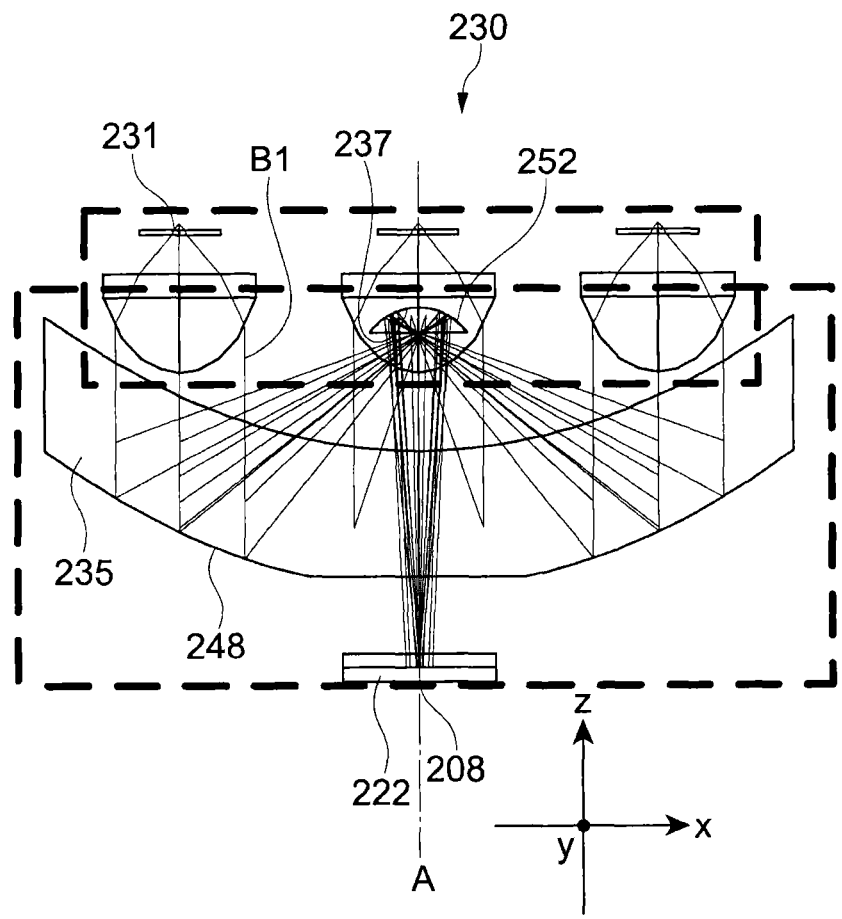
FIG. 22 is a view showing a configuration of a light collecting unit according to a second embodiment of the present technology.

FIG. 22 is a view showing a configuration of a light collecting unit 230 according to this embodiment. In this embodiment, a laser light source array including a total of 8 laser light sources 231 is used. The 8 laser light sources 231 are arranged in a matrix of three in the x-axis direction by three in the y-axis direction and the center of the matrix is vacant. As shown in FIG. 22, a reflecting member 248 including an aspheric reflecting surface 235 is arranged at a position opposed to the plurality of laser light sources 231. The reflecting member 248 is arranged at a position relatively close to the plurality of laser light sources 231 so as to cover the plurality of laser light sources 231.

A reflecting member 252 including a concave reflecting surface 237 is arranged at the vacant position located at substantially the center of the 8 laser light sources 231. The reflecting member 252 is arranged such that the concave reflecting surface 237 is opposed to the aspheric reflecting surface 235. An opening (not shown) is formed at substantially the center of the aspheric reflecting surface 235, and a predetermined light collecting point 208 on a phosphor layer 222 is set beyond the opening (on the side opposite to the aspheric reflecting surface 235).

Blue laser light B1 as substantially parallel light fluxes is output along a normal direction (z-axis direction) of a surface on which the plurality of laser light sources 231 are arranged, that is, along the same direction as the optical-axis direction of the optical axis A of the phosphor unit. The blue laser light B1 is reflected on the aspheric reflecting surface 235 toward the reflecting member 252. Then, the blue laser light B1 is reflected on the concave reflecting surface 237 and collected to the light collecting point 208 via the opening.

In such a manner, the reflecting member 252 including the concave reflecting surface 237 may be used. The concave reflecting surface 237 serves as a reflecting surface that reflects the blue laser light B1, which is reflected on the aspheric reflecting surface 235, toward the phosphor 222. Appropriately selecting a reflecting surface having a desired shape allows the downsizing, a desired shape, and the like of the light source apparatus to be achieved.

<Third Embodiment>

Figure 23:
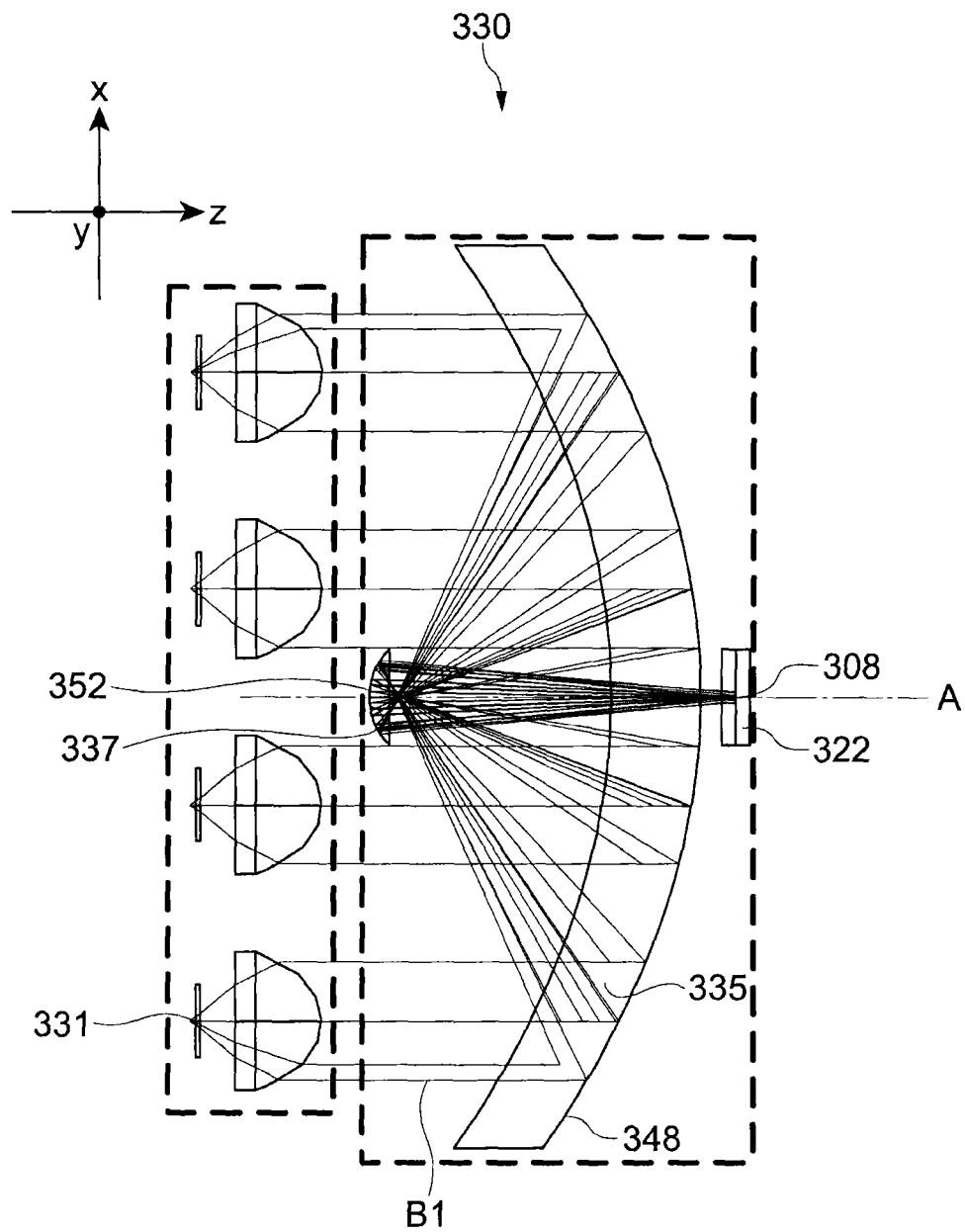
FIG. 23 is a view showing a configuration of a light collecting unit according to a third embodiment of the present technology.

FIG. 23 is a view showing a configuration of a light collecting unit 330 according to a third embodiment of the present technology. The light collecting unit 330 according to this embodiment has substantially the same configuration as the light collecting unit 230 according to the second embodiment. The main difference from the light collecting unit 230 is in the number of laser light sources 331 and the position of a reflecting member 352.

In this embodiment, a laser light source array including a total of 12 laser light sources 331 is used. The 12 laser light sources 331 are arranged in a matrix of four in the x-axis direction by three in the y-axis direction. As shown in FIG. 23, a reflecting member 352 is arranged at substantially the center of the 12 laser light sources 331 and at a position relatively closer to an aspheric reflecting surface 335 than the plurality of laser light sources 331.

Blue laser light B1 as substantially parallel light fluxes is output along a normal direction (z-axis direction) of a surface on which the plurality of laser light sources 331 are arranged, that is, along the same direction as the optical-axis direction of the optical axis A of the phosphor unit. The blue laser light B1 is reflected on the aspheric reflecting surface 335 toward the reflecting member 352. Then, the blue laser light B1 is reflected on the concave reflecting surface 337 and collected to a light collecting point 308 via an opening (not shown). Such a configuration may be adopted.

<Fourth Embodiment>

Figure 24:
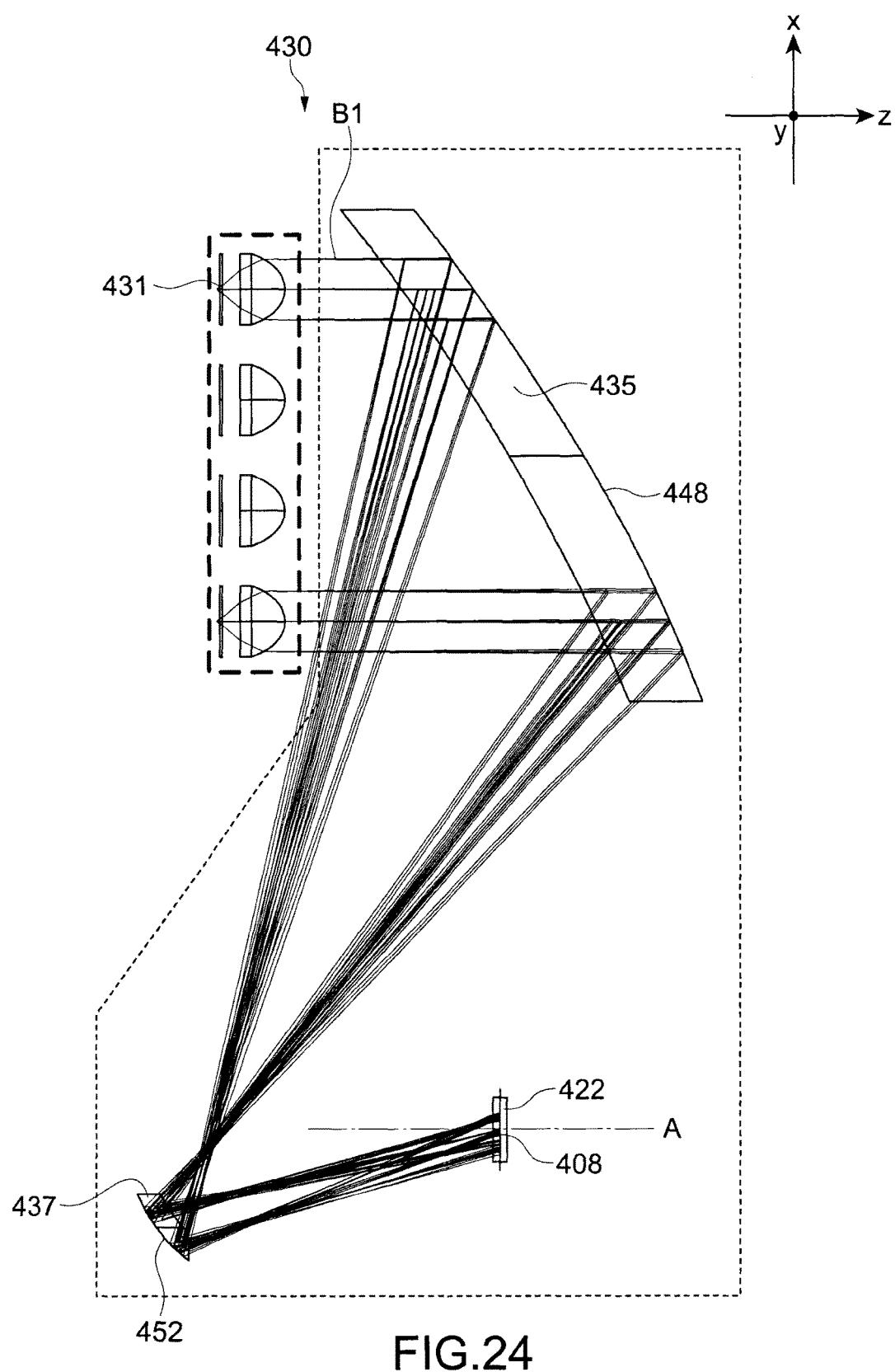
FIG. 24 is a view showing a configuration of a light collecting unit according to a fourth embodiment of the present technology.

FIG. 24 is a view showing a configuration of a light collecting unit 430 according to a fourth embodiment of the present technology. In the light collecting unit 430 according to this embodiment as well, a reflecting member 452 including a concave reflecting surface 437 is used. As shown in FIG. 24, in this embodiment, a light collecting point 408 on a phosphor layer 422 is set at a position relatively far from the positions of a plurality of laser light sources 431 and a position of an aspheric reflecting surface 435 in the x-axis direction. In order to collect the blue laser light B1 to the light collecting point 408, the reflecting member 452 is also arranged at a position spaced away from the aspheric reflecting surface 435 and the like. It should be noted that a laser light source array including 28 laser light sources 431 is used. Such a configuration may be adopted.

Figure 25:
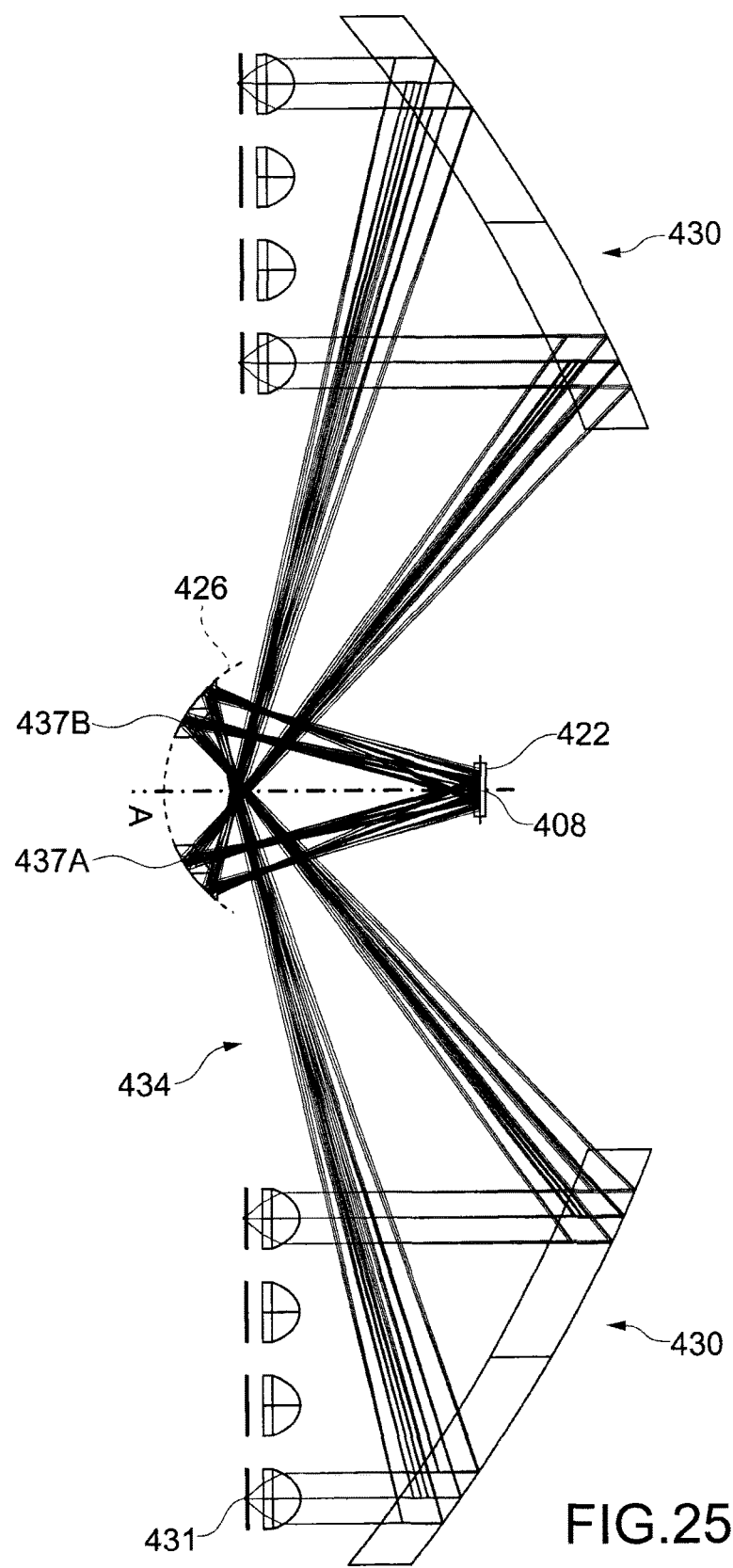
FIG. 25 is a view showing a configuration example in the case where the two light collecting units shown in FIG. 24 are arranged side by side.

FIG. 25 is a view showing a configuration example in the case where the two light collecting units 430 shown in FIG. 24 are used. As shown in FIG. 25, the light collecting units 430 are arranged symmetrically about the optical axis A of light output from a phosphor unit 420. Thus, the number of laser light sources 431 can be increased, and a high luminance of white light to be output can be achieved.

For example, with the position and the like of the reflecting member 452 being appropriately set, the most suitable configuration for the arrangement of a plurality of light collecting optical systems 434 can be achieved. It should be noted that two concave reflecting surfaces 437A and 437B shown in FIG. 25 are both spherical surfaces. For example, a concave reflecting surface 426 formed of one spherical surface may be used instead of the two concave reflecting surfaces 437A and 437B.

As in this embodiment, in the case where one concave reflecting surface 437 is used in one light collecting optical system, an arrangement for each of the light collecting optical systems 434 can be easily performed. In this case, an adjustment mechanism that can appropriately adjust a position, an arrangement angle, and the like of each of the plurality of concave reflecting surfaces 437 may be used. This allows the plurality of light collecting optical systems to be easily arranged.

The configuration of the adjustment mechanism is not limited. For example, a holding mechanism that holds a reflecting member, a guiding mechanism that rotates and moves the holding mechanism, and the like may be appropriately used. With the adjustment mechanism, a reflecting member may be adjusted and fixed to an appropriate position. Further, with an actuator and the like, a configuration in which the position of the reflecting member can be adjusted during an operation of the light source apparatus may be adopted.

<Fifth Embodiment>

Figure 26:
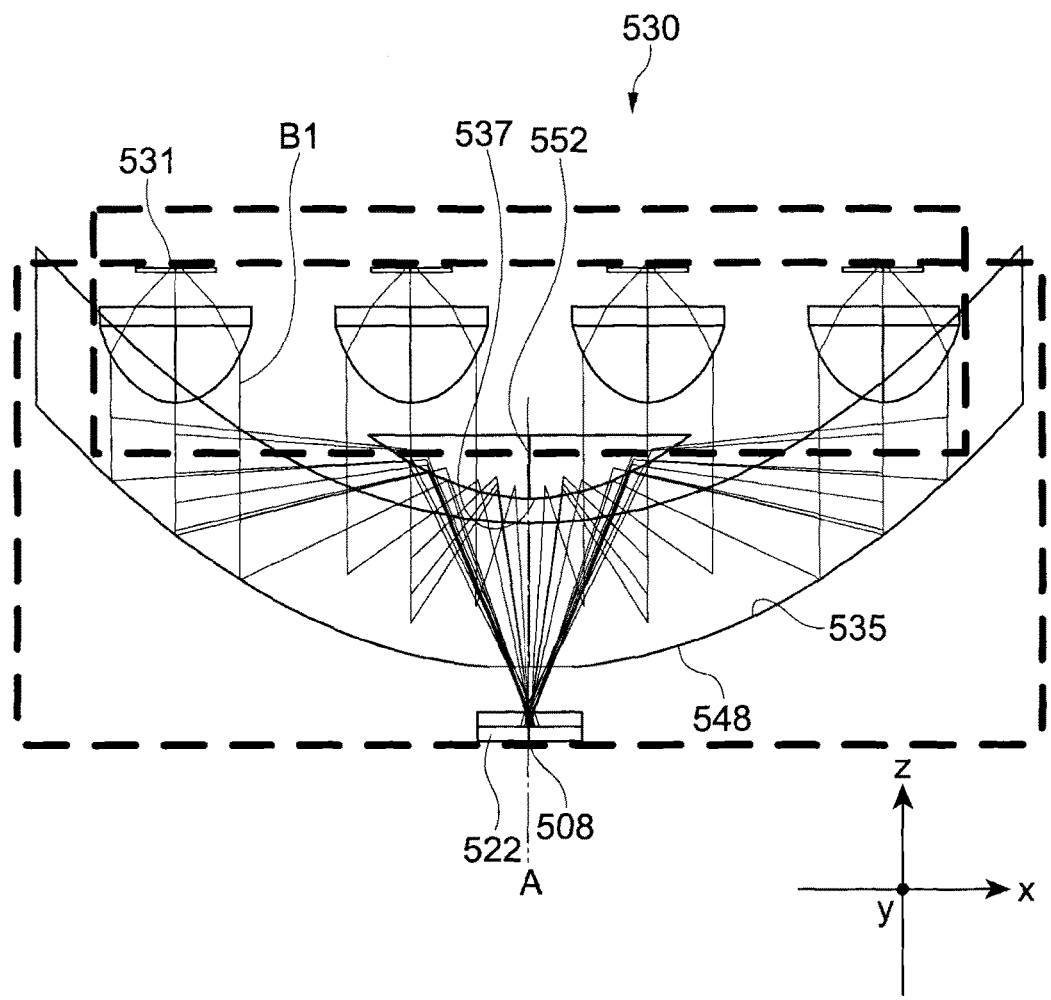
FIG. 26 is a view showing a configuration of a light collecting unit according to a fifth embodiment of the present technology.

FIG. 26 is a view showing a configuration of a light collecting unit 530 according to a fifth embodiment of the present technology. In this embodiment, a laser light source array including a total of 10 laser light sources 531 is used. The 10 laser light sources 531 are arranged in a matrix of four in the x-axis direction by three in the y-axis direction and two at the center of the matrix are vacant. As shown in FIG. 26, a reflecting member 548 including an aspheric reflecting surface 535 is arranged at a position opposed to the plurality of laser light sources 531. The reflecting member 548 is arranged at a position relatively close to the plurality of laser light sources 531 so as to cover the plurality of laser light sources 531.

At the vacant position at substantially the center of the 10 laser light sources 531, a reflecting member 552 including a convex reflecting surface 537 is arranged. The reflecting member 552 is arranged at a position closer to the aspheric reflecting surface 535 than the plurality of laser light sources 531.

The reflecting member 552 is arranged such that the convex reflecting surface 537 is opposed to the aspheric reflecting surface 535. An opening (not shown) is formed at substantially the center of the aspheric reflecting surface 535, and a predetermined light collecting point 508 on a phosphor layer 522 is set beyond the opening (on the side opposite to the aspheric reflecting surface 535).

Blue laser light B1 as substantially parallel light fluxes is output along a normal direction (z-axis direction) of a surface on which the plurality of laser light sources 531 are arranged, that is, along the same direction as the optical-axis direction of the optical axis A of the phosphor unit. The blue laser light B1 is reflected on the aspheric reflecting surface 535 toward the reflecting member 552. Then, the blue laser light B1 is reflected on the convex reflecting surface 537 and collected to the light collecting point 508 via the opening.

In such a manner, the reflecting member 552 including the convex reflecting surface 537 may be used. The convex reflecting surface 537 serves as a reflecting surface that reflects the blue laser light B1, which is reflected on the aspheric reflecting surface 535, toward a phosphor 522. Appropriately selecting a reflecting surface having a desired shape allows the downsizing, a desired shape, and the like of the light source apparatus to be achieved.

<Sixth Embodiment>

Figure 27:
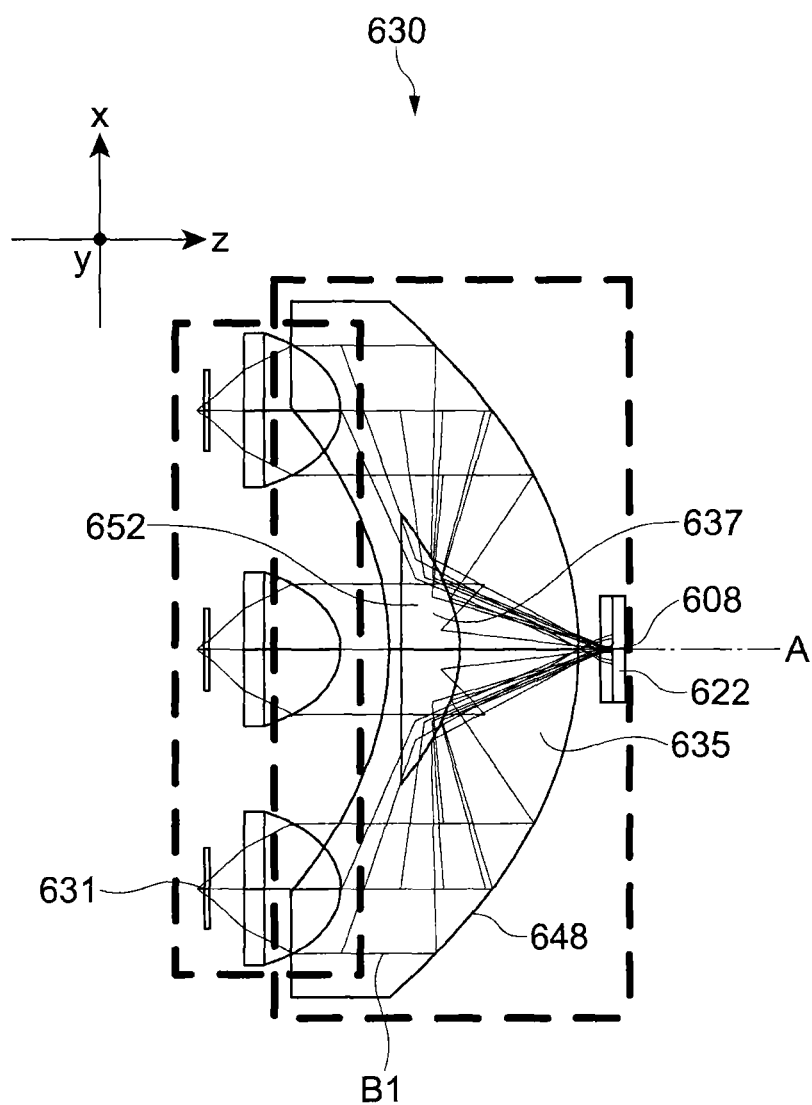
FIG. 27 is a view showing a configuration of a light collecting unit according to a sixth embodiment of the present technology.

FIG. 27 is a view showing a configuration of a light collecting unit 630 according to a sixth embodiment of the present technology. The light collecting unit 630 according to this embodiment has substantially the same configuration as the light collecting unit 530 of the fifth embodiment. The main difference from the light collecting unit 530 is in the number of laser light sources 631.

In this embodiment, a laser light source array including a total of 8 laser light sources 631 is used. The 8 laser light sources 631 are arranged in a matrix of three in the x-axis direction by three in the y-axis direction and the center of the matrix is vacant. As shown in FIG. 27, a reflecting member 652 is arranged at substantially the center of the 8 laser light sources 631.

Blue laser light B1 as substantially parallel light fluxes is output along a normal direction (z-axis direction) of a surface on which the plurality of laser light sources 631 are arranged, that is, along the same direction as the optical-axis direction of the optical axis A of the phosphor unit. The blue laser light B1 is reflected on an aspheric reflecting surface 635 toward the reflecting member 652. Then, the blue laser light B1 is reflected on a convex reflecting surface 637 and collected to a light collecting point 608 via an opening. Such a configuration may be adopted.

FIG. 28 is a schematic view showing another configuration example in which a plurality of light collecting units are arranged. For example, as shown in FIGS. 28(A) and (B), four light collecting units 730 (830) may be arranged symmetrically about the optical axis A. Each of the light collecting units 730 (830) is appropriately adjusted such that light is collected at a light collecting point on the optical axis A. The number of light collecting units to be arranged is not limited, and more light collecting units may be arranged.

In FIG. 28(A), a surface having a rectangular planar shape is used as an arrangement surface on which a plurality of laser light sources are arranged. The planar shape of the arrangement surface is one viewed from an output direction of output light from the plurality of laser light sources. For example, in the light source portion 32 shown in FIG. 5, the planar shape of the plate-like frame 39 corresponds to the planar shape of the arrangement surface. As shown in FIG. 28, the outer shape viewed from the output direction of the light collecting unit 730 is also formed into a rectangular shape according to the shape of the arrangement surface.

In FIG. 28(B), a surface having a triangular shape is used as an arrangement surface on which a plurality of laser light sources are arranged. So, the outer shape of the light collecting unit 830 can also be formed into a triangular shape. Since an aspheric reflecting surface is used as the light collecting optical system, the degree of freedom on the number of light sources, the arrangement thereof, and the like is increased. This is because the shape, the size, and the like of the aspheric reflecting surface can be appropriately designed according to light fluxes from light sources. As a result, such a light source that a plurality of light sources are arranged on the arrangement surface having a triangular shape as shown in FIG. 28(B) can be used. Then, a light collecting unit whose outer shape viewed from the optical-axis direction is a triangular shape can be achieved.

In such a manner, since the shape of the light collecting unit can be freely set as described above, it is easy to form the light collecting unit into a shape appropriate to a multi-unit configuration and also arrange a plurality of light collecting units in a limited space. As a result, the downsizing of the light source apparatus can be achieved.

Additionally, arranging the plurality of light collecting units symmetrically about the optical axis A can lead to the degree of freedom on the number of light collecting units and a combination of light collecting units having various shapes. As a result, it is possible to correspond to various specifications. It should be noted that the planar shape of the arrangement surface is not limited to a rectangular or triangular shape and may be a multiangular shape, a circular shape, and the like. The shape of the arrangement surface may also be appropriately set according to the shape of a necessary light collecting unit.

<Image Display Apparatus>

An image display apparatus according to this embodiment will be described. Here, a projector capable of mounting the light source apparatus described in the above embodiments will be described as an example. FIG. 29 is a schematic view showing a configuration example of the projector.

A projector 2000 includes the light source apparatus 1000 according to the present technology (e.g., light source apparatus described in each of the embodiments described above), an illumination system 1500, and a projection system 1700. The illumination system 1500 includes an image generation element 1510 and an illumination optical system 1520. The image generation element 1510 generates an image based on applied light. The illumination optical system 1520 applies output light from the light source apparatus 1000 to the image generation element 1510. The projection system 1700 projects the image generated by the image generation element 1510.

As shown in FIG. 29, the illumination system 1500 includes an integrator element 1530, a polarization conversion element 1540, and a light collecting lens 1550. The integrator element 1530 includes a first fly-eye lens 1531 and a second fly-eye lens 1532. The first fly-eye lens 1531 includes a plurality of microlenses two-dimensionally arranged. The second fly-eye lens 1532 includes a plurality of microlenses that are arranged to correspond to the respective microlenses of the first fly-eye lens 1531.

Parallel light that enters the integrator element 1530 from the light source apparatus 1000 is split into a plurality of light fluxes by the microlenses of the first fly-eye lens 1531 to form images on the corresponding microlenses of the second fly-eye lens 1532. The microlenses of the second fly-eye lens 1532 each function as a secondary light source and apply a plurality of parallel light beams with the same luminance to the polarization conversion element 1540 as incident light.

The integrator element 1530 has a function of trimming the incident light to be applied to the polarization conversion element 1540 from the light source apparatus 1000 so as to have a uniform luminance distribution as a whole.

The polarization conversion element 1540 has a function of making a polarization state of incident light uniform, the incident light being input via the integrator element 1530 and the like. The polarization conversion element 1540 outputs output light including blue laser light B3, green light G3, and red light R3 via the light collecting lens 1550 and the like, the light collecting lens 1550 being arranged on the output side of the light source apparatus 1000, for example.

The illumination optical system 1520 includes dichroic mirrors 1560 and 1570, mirrors 1580, 1590, and 1600, relay lenses 1610 and 1620, field lenses 1630R, 1630G, and 1630B, liquid crystal light valves 1510R, 1510G, and 1510B serving as the image generation element, and a dichroic prism 1640.

The dichroic mirrors 1560 and 1570 have property of selectively reflecting light of color in a predetermined wavelength range and transmitting light in the other wavelength range. With reference to FIG. 29, for example, the dichroic mirror 1560 selectively reflects the red light R3. The dichroic mirror 1570 selectively reflects the green light G3 out of the green light G3 and the blue light G3 having passed through the dichroic mirror 1560. The remaining blue light B3 passes through the dichroic mirror 1570. Thus, the light output from the light source apparatus 1000 is split into a plurality of light beams with different colors.

The split red light R3 is reflected on the mirror 1580, converted into parallel light by passing through the field lens 1630R, and then input into the liquid crystal light valve 1510R for modulation of red light. The green light G3 is converted into parallel light by passing through the field lens 1630G and then input into the liquid crystal light valve 1510G for modulation of green light. The blue light B3 passes through the relay lens 1610 and is reflected on the mirror 1590, and further passes through the relay lens 1620 and is reflected on the mirror 1600. The blue light B3 reflected on the mirror 1600 is converted into parallel light by passing through the field lens 1630B, and then input into the liquid crystal light valve 1510B for modulation of blue light.

The liquid crystal light valves 1510R, 1510G, and 1510B are electrically connected to a signal source (for example, personal computer (PC)) (not shown) that supplies an image signal containing image information. The liquid crystal light valves 1510R, 1510G, and 1510B modulate the input light for each pixel based on supplied image signals of the respective colors, and generate a red-color image, a green-color image, and a blue-color image, respectively. The modulated light of each color (formed image) is input into the dichroic prism 1640 to be combined. The dichroic prism 1640 superimposes and combines the light beams of the respective colors that are input from the three directions, and then outputs the combined light toward the projection system 1700.

The projection system 1700 includes a plurality of lenses 1710 and the like and applies the light combined by the dichroic prism 1640 onto a screen (not shown). Thus, a full-color image is displayed.

The light source apparatus 1000 according to the present technology allows the projector 2000 to be downsized. Further, the appropriate setting of the shape and the like of the light source apparatus 1000 allows the designs of the outer shape of the projector 2000 to be improved, for example.

(Other Embodiments)

The present technology is not limited to the embodiments described above and can achieve other various embodiments.

Figure 30:
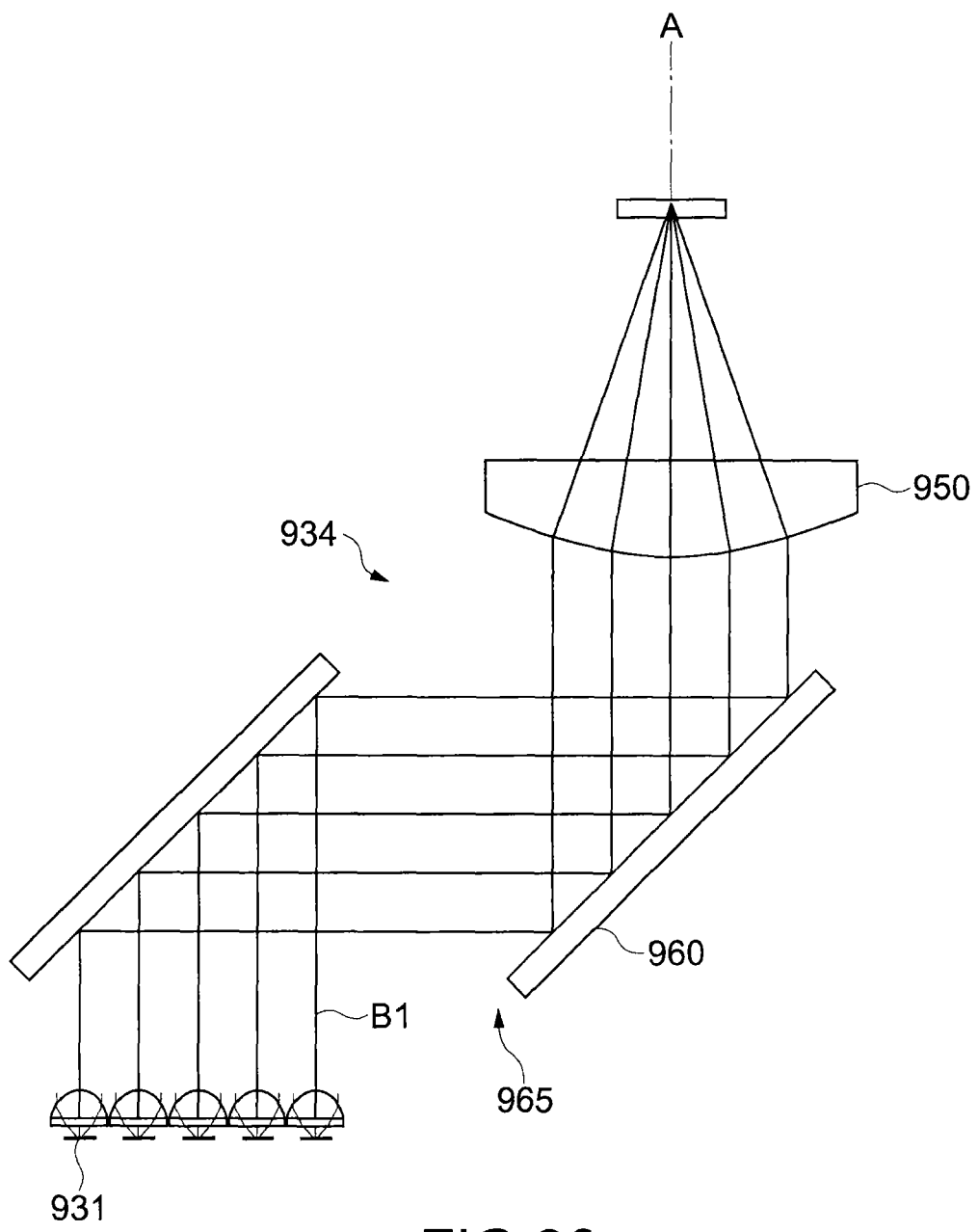
FIG. 30 is a schematic view showing a modified example of a light collecting optical system according to the present technology.

For example, as shown in FIG. 30, as a light collecting optical system 934, a system including a light collecting lens 950 that collects light B1 from a plurality of laser light sources 931 may be used. Further, a light guide optical system 965 may be used. The light guide optical system 965 guides the light B1 from the plurality of laser light sources 931 to the light collecting lens 950 and includes one or more planar reflecting surfaces 960. If the optical-axis direction of the optical axis A of the phosphor unit and the optical-axis direction of the plurality of laser light sources 931 are set to be the same direction, a configuration using the light collecting lens 950 or the like as described above can be adopted. Further, if both of the output directions are set to be the same direction, the type of the light collecting lens 950, the configuration of the light guide optical system 965, and the like are not limited.

In the projector 2000 shown in FIG. 29, the illumination system 1500 formed using a transmissive liquid crystal panel is described. However, the illumination system can also be formed using a reflective liquid crystal panel. A digital micro-mirror device (DMD) and the like may be used as the image generation element. Additionally, a color combining prism that combines video signals of RGB colors or of a polarization beam splitter (PBS), a total internal reflection (TIR) prism, and the like may be used, instead of the dichroic prism 1640.

Further, in the embodiment described above, an apparatus other than the projector may be formed as the image display apparatus according to the present technology. In addition, the light source apparatus according to the present technology may be used for an apparatus other than the image display apparatus.

At least two of features of the embodiments described above can be combined.

It should be noted that the present technology can have the following configurations.

(1) A light source unit, including:
  one or more solid-state light sources that are arranged on a rear side of an output portion and each output light in a predetermined wavelength range along the same direction as an optical-axis direction, the output portion including a light emitter that is excited by the light in the predetermined wavelength range with a predetermined direction as the optical-axis direction to emit visible light in a wavelength range longer than the predetermined wavelength range and is capable of outputting light containing the light in the predetermined wavelength range and the visible light from the light emitter along the optical-axis direction; and
  a light collecting optical system that collects the light in the predetermined wavelength range, the light being output from the one or more solid-state light sources, onto the light emitter from the rear side of the output portion.
(2) The light source unit according to (1), in which
  the light collecting optical system includes an aspheric reflecting surface that reflects and collects the light from the one or more solid-state light sources.
(3) The light source unit according to (2), in which
  the light collecting optical system includes a reflecting member that reflects the light from the one or more solid-state light sources to the light emitter, the light being reflected on the aspheric reflecting surface.
(4) The light source unit according to (3), in which
  the reflecting member includes any one of a planar reflecting surface, a concave reflecting surface, and a convex reflecting surface as a reflecting surface that reflects the light from the one or more solid-state light sources.
(5) The light source unit according to (1), in which
  the light collecting optical system includes a light collecting lens that collects the light from the one or more solid-state light sources.
(6) The light source unit according to (5), in which
  the light collecting optical system includes a light guide optical system including one or more planar reflecting surfaces and guiding the light from the one or more solid-state light sources to the light collecting lens.
(7) The light source unit according to any one of (1) to (6), further including
  an arrangement surface that is a surface perpendicular to the optical-axis direction, the one or more solid-state light sources being arranged on the arrangement surface.
(8) The light source unit according to (7), in which
  the arrangement surface has a multiangular shape in plan view from the optical-axis direction.
(9) The light source unit according to (7) or (8), in which
  the arrangement surface has a triangular shape in plan view from the optical-axis direction.
(10) The light source unit according to any one of (1) to (9), further including
  a support portion that supports the one or more solid-state light sources and the light collecting optical system as one unit.

DESCRIPTION OF SYMBOLS

A optical axis
B1 blue laser light
G2 green light
R2 red light
W white light
20, 120 phosphor unit
22, 122, 222, 422, 522 phosphor layer
30, 130, 230, 330, 430, 530, 630, 730, 830 light collecting unit
31, 131, 231, 331, 431, 531, 631, 931 laser light source
33 support portion
34, 434, 934 light collecting optical system
35, 135, 235, 335, 435, 535, 635 aspheric reflecting surface
37, 137 planar reflecting surface
42 arrangement surface
52, 152 planar reflecting member
100, 1000 light source apparatus
237, 337, 437 concave reflecting surface
252, 352, 452, 552, 652 reflecting member
537, 637 convex reflecting surface
950 light collecting lens
960 planar reflecting surface
965 light guide optical system
1500 illumination system
1510 image generation element
1520 illumination optical system
1700 projection system
2000 projector

The invention claimed is:
1. A light source unit, comprising:
  one or more solid-state light sources that are arranged on a rear side of an output portion, each of the one or more solid-state light sources output light in a predetermined wavelength range along a same direction as an optical-axis direction, the output portion including a light emitter that is excited by the light from the one or more solid-state light sources to emit visible light in a wavelength range longer than the predetermined wavelength range, the light emitter being configured to output light including the light in the predetermined wavelength range and the visible light along the optical-axis direction; and
  a light collecting optical system that collects the light in the predetermined wavelength range from the one or more solid-state light sources and provides the light in the predetermined wavelength range to the light emitter from the rear side of the output portion, the light collecting optical system including a support that supports at least one reflecting member that is adjustably attached to the support.
2. The light source unit according to claim 1, wherein the light collecting optical system includes an aspheric reflecting surface that reflects and collects the light from the one or more solid-state light sources.
3. The light source unit according to claim 2, wherein the reflecting member reflects the light from the one or more solid-state light sources to the light emitter after the light is reflected on the aspheric reflecting surface.
4. The light source unit according to claim 3, wherein the reflecting member includes any one of a planar reflecting surface, a concave reflecting surface, and a convex reflecting surface as a reflecting surface that reflects the light from the one or more solid-state light sources.
5. The light source unit according to claim 1, wherein the light collecting optical system includes a light collecting lens that collects the light from the one or more solid-state light sources.
6. The light source unit according to claim 5, wherein the light collecting optical system includes a light guide optical system including one or more planar reflecting surfaces and guiding the light from the one or more solid-state light sources to the light collecting lens.
7. The light source unit according to claim 1, further comprising:

an arrangement surface that is a surface perpendicular to the optical-axis direction, the one or more solid-state light sources being arranged on the arrangement surface.

8. The light source unit according to claim 7, wherein the arrangement surface has a multangular shape in plan view from the optical-axis direction.

9. The light source unit according to claim 7, wherein the arrangement surface has a triangular shape in plan view from the optical-axis direction.

10. The light source unit according to claim 1, wherein the support further supports the one or more solid-state light sources to support the solid-state light sources and the light collecting optical system as one unit.

11. A light source apparatus, comprising:
an output portion including a light emitter that is excited by light in a predetermined wavelength range with a predetermined direction corresponding to an optical-axis direction to emit visible light in a wavelength range longer than the predetermined wavelength range, the light emitter being configured to output light including the light in the predetermined wavelength range and the visible light along the optical-axis direction; and
one or more light source units including
one or more solid-state light sources that are arranged on a rear side of the output portion, each of the one or more solid-state light sources output the light in the predetermined wavelength range along a same direction as the optical-axis direction, and
a light collecting optical system that collects the light in the predetermined wavelength range from the one or more solid-state light sources and provides the light in the predetermined wavelength range to the light emitter from the rear side of the output portion, the light collecting optical system including a support that supports at least one reflecting member that is adjustably attached to the support.

12. The light source apparatus according to claim 11, wherein the one or more light source units include a plurality of light source units that are arranged symmetrically about the optical axis of the light output from the output portion.

13. An image display apparatus, comprising:
a light source apparatus including
an output portion including a light emitter that is excited by light in a predetermined wavelength range with a predetermined direction corresponding to an optical-axis direction to emit visible light in a wavelength range longer than the predetermined wavelength range, the light emitter being configured to output light including the light in the predetermined wavelength range and the visible light along the optical-axis direction, and
one or more light source units including
one or more solid-state light sources that are arranged on a rear side of the output portion, each of the one or more solid-state light sources output the light in the predetermined wavelength range along a same direction as the optical-axis direction, and
a light collecting optical system that collects the light in the predetermined wavelength range from the one or more solid-state light sources and provides the light in the predetermined wavelength range to the light emitter from the rear side of the output portion, the light collecting optical system including a support that supports at least one reflecting member that is adjustably attached to the support;
an image generation system including
an image generation element that generates an image based on applied light, and
an illumination optical system that applies output light from the light source apparatus to the image generation element; and
a projection system that projects the image generated by the image generation element.

* * * * *